United States Patent
Kitayama

(10) Patent No.: US 7,590,586 B2
(45) Date of Patent: Sep. 15, 2009

(54) METHOD OF AND SYSTEM FOR AUCTIONING OFF COMMERCIAL FRAMES FOR ON-AIR CONTENT AND METHOD OF AND SYSTEM FOR AUTOMATICALLY SENDING ON-AIR CONTENT

(75) Inventor: Jiro Kitayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1209 days.

(21) Appl. No.: 10/123,267

(22) Filed: Apr. 15, 2002

(65) Prior Publication Data

US 2002/0169709 A1 Nov. 14, 2002

(30) Foreign Application Priority Data

Apr. 16, 2001 (JP) ............................. 2001-117141

(51) Int. Cl.
*G06Q 40/00* (2006.01)
(52) U.S. Cl. ............................. 705/37; 705/14; 705/26
(58) Field of Classification Search ............... 705/14, 705/37
See application file for complete search history.

(56) References Cited

U.S. PATENT DOCUMENTS

| | | | | |
|---|---|---|---|---|
| 5,774,534 | A * | 6/1998 | Mayer | 379/142.01 |
| 6,253,189 | B1 * | 6/2001 | Feezell et al. | 705/14 |
| 6,324,519 | B1 * | 11/2001 | Eldering | 705/14 |
| 6,338,043 | B1 * | 1/2002 | Miller | 705/14 |
| 6,477,707 | B1 * | 11/2002 | King et al. | 725/97 |
| 6,937,996 | B1 * | 8/2005 | Forsythe et al. | 705/16 |
| 6,985,882 | B1 * | 1/2006 | Del Sesto | 705/37 |
| 7,124,091 | B1 * | 10/2006 | Khoo et al. | 705/14 |
| 7,136,906 | B2 * | 11/2006 | Giacalone, Jr. | 709/218 |
| 2001/0014876 | A1 * | 8/2001 | Miyashita | 705/37 |
| 2001/0014969 | A1 * | 8/2001 | Seki | 725/1 |
| 2001/0020236 | A1 * | 9/2001 | Cannon | 707/1 |
| 2001/0049824 | A1 * | 12/2001 | Baker et al. | 725/109 |
| 2001/0052000 | A1 * | 12/2001 | Giacalone, Jr. | 709/218 |
| 2002/0002525 | A1 * | 1/2002 | Arai et al. | 705/37 |
| 2002/0026351 | A1 * | 2/2002 | Coleman | 705/14 |
| 2002/0046098 | A1 * | 4/2002 | Maggio | 705/14 |
| 2002/0056121 | A1 * | 5/2002 | Ledbetter | 725/87 |
| 2002/0065034 | A1 * | 5/2002 | Zhang | 455/2.01 |
| 2002/0065826 | A1 * | 5/2002 | Bell et al. | 707/10 |
| 2002/0087400 | A1 * | 7/2002 | Khoo et al. | 705/14 |

(Continued)

*Primary Examiner*—Jagdish N Patel
*Assistant Examiner*—Sara Chandler
(74) *Attorney, Agent, or Firm*—Frommer Lawrence & Haug LLP; William S. Frommer; Paul A. Levy

(57) ABSTRACT

A method of and system for auctioning off commercial (CM) frame for on-air content and a method of and system for automatically sending on-air content. A broadcast station presents as an auctioneer a CM frame for sale and a lowest sale price to tenderers via a communication network. On the basis of the supplied information, each tenderer sends an auction application price for the CM frame to the auctioneer via the communication network. The auctioneer determines a successful tenderer for the CM frame on the basis of the highest auction application prices presented by the tenderers. The CM frame successfully tendered by this network auction is automatically registered in a broadcast sales information system along with CM content information to be incorporated in the CM frame. A content sending system takes the registered CM content from a CM bank at a predetermined broadcast time for automatic transmission and broadcasting.

15 Claims, 21 Drawing Sheets

U.S. PATENT DOCUMENTS

2002/0087980 A1* 7/2002 Eldering et al. ............... 725/35
2002/0091762 A1* 7/2002 Sohn et al. .................. 709/203
2002/0120501 A1* 8/2002 Bell et al. ..................... 705/14
2002/0143901 A1* 10/2002 Lupo et al. .................. 709/219
2003/0191816 A1* 10/2003 Landress et al. ............ 709/219

* cited by examiner

FIG. 9

CM FRAME INFORMATION

PROGRAM NAME: LOVE STORY (PROGRAM CODE ABC12345)
GENRE: TRENDY DRAMA
CAST: MARUYAMA KAKUO, YAMAKAWA TANIKO
DIRECTOR: SHIROSAWA TOSHIO
SCRIPT: YAMAMURA TARO
BROADCAST TIME: FRIDAY, EVERY WEEK, FROM 20:00 TO 20:55

■ END OF TENDERING   ■ IN TENDERING

FRAME 1234A   FRAME 1234B   FRAME 1234C   FRAME 1234D

TRANSITION OF AUDIENCE RATE

FIG. 10

AUCTION APPLICATION INPUT

PROGRAM NAME: LOVE STORY (PROGRAM CODE ABC12345)

TENDER STATUS

| BROADCAST DATE | BROADCAST TIME | CM FRAME NO. | TIME FRAME | LOWEST PRICE | SALE STATUS | HIGHEST AUCTION APPLICATION PRICE | KIND OF INDUSTRY | TENDER DEADLINE |
|---|---|---|---|---|---|---|---|---|
| 2000/4/1 | 20:00:00 | 1234A01 | 15:00 | ¥5,000,000 | IN TENDERING | ¥6,000,000 | CAR | 2000/3/31 13:00 |
| 2000/4/1 | 20:00:15 | 1234A02 | 15:00 | ¥4,500,000 | IN TENDERING | ¥4,500,000 | HOUSEHOLD APPLIANCE | 2000/3/31 13:00 |
| 2000/4/1 | 20:00:30 | 1234A03 | 15:00 | ¥4,500,000 | IN TENDERING | ¥4,600,000 | COSMETICS | 2000/3/31 13:00 |
| 2000/4/1 | 20:00:45 | 1234A04 | 15:00 | ¥5,000,000 | IN TENDERING | ¥5,500,000 | CLOTHES | 2000/3/31 13:00 |

TO APPLY FOR TENDER, FILL IN THE FOLLOWING BOXES AND CLICK APPLY BUTTON.

AUCTION APPLICATION INFORMATION BOXES

CLIENT REGISTRATION NUMBER: 3591345

| CM FRAME NO. | TIME | APPLICATION PRICE | SCHEDULED CM MATERIAL NO. |
|---|---|---|---|
| 1234A01 | 15:00 | ¥7,000,000 | ABC123455 |

[APPLY]

FIG. 11

SUCCESSFUL TENDER NOTICE

PROGRAM NAME: LOVE STORY (PROGRAM CODE ABC12345)

RESULT OF TENDER

| BROADCAST DATE | BROADCAST TIME | CM FRAME NO. | TIME FRAME | SUCCESSFUL TENDER PRICE | KIND OF INDUSTRY | SUCCESSFUL TENDER RANKING |
|---|---|---|---|---|---|---|
| 2000/4/1 | 20:00:00 | 1234A01 | 15:00 | ¥5,000,000 | CAR | 1 |
| 2000/4/1 | 20:00:15 | 1234A02 | 15:00 | ¥4,500,000 | HOUSEHOLD APPLIANCE | 3 |
| 2000/4/1 | 20:00:30 | 1234A03 | 15:00 | ¥4,500,000 | COSMETICS | NOT APPLIED |
| 2000/4/1 | 20:00:45 | 1234A04 | 15:00 | ¥5,000,000 | CLOTHES | NOT APPLIED |

CHECK SUCCESSFUL TENDER RESULT AND CLICK ACKNOWLEDGEMENT BUTTON.

SUCCESSFUL TENDER INFORMATION ACKNOWLEDGEMENT BOXES

CLIENT REGISTRATION NUMBER: 3591345

| CM FRAME NO. | TIME | SUCCESSFUL TENDER PRICE | CM MATERIAL NO. |
|---|---|---|---|
| 1234A01 | 15:00 | ¥7,000,000 | ABC123455 |

[ACKNOWLEDGE]   [WITHDRAW]

IF YOU DO NOT ACKNOWLEDGE UNTIL A SPECIFIED TIME OR IF YOU WITHDRAW FROM THE AUCTION, YOUR AUCTION RIGHT SHIFTS TO THE TENDERER WHO IS NEXT HIGH IN SUCCESSFUL TENDER PRIORITY. IN THIS CASE, CANCEL FEE UNDER THE OUR ACCOUNTING RULE WILL BE CHARGED.

METHOD OF AND SYSTEM FOR AUCTIONING OFF COMMERCIAL FRAMES FOR ON-AIR CONTENT AND METHOD OF AND SYSTEM FOR AUTOMATICALLY SENDING ON-AIR CONTENT

BACKGROUND OF THE INVENTION

The present invention relates generally to a method of and system for auctioning off commercial (CM) frames for on-air content and a method of and system for automatically sending on-air content.

In broadcasting industry, the production department of a broadcast station produces and organizes content to be put on the air and the transmission department puts on the air the produced and organized content, thereby supplying television programs to an audience. Television programs, which are on-air content, are largely classified into "live" programs in which an event is broadcast in real time and "recorded" programs in which an event recorded in advance is reproduced later for broadcasting. Each of the television programs, live or recorded, in commercial broadcasting is composed of at least one piece of program content and one piece of CM content each of most television programs is constituted as on-air content which is a time-series set managed in sequence and time composed of plural program frames obtained by dividing one piece of program content or incorporating plural different pieces of program content and plural CM frames each incorporated with plural pieces of CM content.

Referring to FIG. 22, there is shown a schematic diagram illustrating an exemplary configuration of on-air content to be broadcast and the related-art processes for establishing on-air content.

The production department produces various kinds of program content and CM content. In process, the production starts with the gathering of materials on site for example by use of materials gathering equipment. Materials are a collection of video and audio fragments before editing which are called primitive materials. Next, the collected materials are edited and manipulated by use of editing equipment into sources. Based on these sources, program content Ctp and CM content Ctm1 through Ctmn are produced. On-air content Ctoa is organized by combining these program content Ctp and CM content Ctm1 through Ctmn.

As shown, typical on-air content Ctoa is composed of plural program frames Frp1 through Frp4 and CM frames Frc11 through Frc34 arranged in a predetermined sequence in time. Each of program frames Frp1 through Frp4 is incorporated with one of the divisions of program content Ctp for example and each of CM frame Frc11 through Frc34 is incorporated with one of CM content Ctm1 through Ctmn.

Generally, CM content is of two types; one is CM content corresponding to a program provider (program sponsor) and the other is sponsor-independent, spot CM content which corresponds to a spot CM provider (spot CM sponsor). Hence, the CM content to be described below includes both types.

It should be noted that CM content Ctm1 through Ctmn may be supplied by program sponsors and/or spot Cm sponsors, rather than produced by the production department of a broadcast station.

On the other hand, the sales department sets the sponsor of the organized on-air content Ctoa. To be specific, the sales department sells CM frames Frc11 through Frc34 of this on-air content Ctoa into which CM content Ctm1 through Ctmn can be incorporated to the sponsor. The sponsor buys desired CM frames and specifies the CM content to be incorporated in the purchased CM frames. Consequently, the CM frame Frc11 through Frc34 is sold before actually being broadcast and, when the sponsor and the CM content to be incorporated are determined, scheduling information including the content of CM frame is registered into a broadcast sales information system which manages sales information and the CM content is prepared. In the preparation of the CM content, the program content Ctp and the CM content Ctm1 through Ctmn are stored and managed by a program bank and a CM bank respectively arranged in each broadcast station.

When the setting of the sponsor and the CM content into each of the CM frames Frc11 through Frc34 and the registration of the scheduling information into the broadcast sales information system have been completed, the transmission department retrieves the scheduling information from the broadcast sales information system at a predetermined time and, on the basis of the retrieved information, broadcasts the time-dependently scheduled on-air content Ctoa by taking the specified program content Ctp and CM content Ctm1 through Ctmn from the program bank and the CM bank respectively, upon which a television program is established. In addition, a part of each televised content (or source) is archived for long-term storage in a reproducible manner.

As described above, the CM frames of on-air content are sold to sponsors. However, in the above-mentioned related-art technology, the sale of Cm frames, the registration of the CM frame content into the broadcast sales information system, and the preparation of CM content are individually and manually performed, thereby presenting a problem of requiring time and labor.

Moreover, at the sale of CM frames, the related-art technology requires the adjustment of the arrangement of the plural CM frames of a same piece of on-air content in order to prevent the setting of competitive sponsors and competitive providers of a same kind of industry, in turn requiring time and labor.

Further, if plural sponsor candidates desire the provision of a same CM frame, individual negotiations are made between persons in charge due to business custom, thereby requiring time and labor to set an optimum sale price.

In addition, in consideration of the time (overhead) involved in the above-mentioned sales and so on, CM frames are sold and the sponsor setting is made much earlier than their actual broadcasting, so that the prices of the CM frames are set in advance (for example, several days before broadcasting), thereby presenting a problem that the audience reaction during broadcasting cannot be reflected onto the price.

Consequently, even if a CM frame is inserted in a program earning a high audience rate during actual broadcasting and therefore can attain high advertisement effects, the price of such a CM frame cannot be dynamically set or reset because its price were set and fixed beforehand. Namely, it is difficult for the related-art technology to reflect the market prices of CM frames onto their sale prices.

Further, the above-mentioned related-art configuration and processing mode require labor for executing the jobs and procedures from the setting of CM frame sponsors by the sales department to the actual broadcasting by the transmission department, thereby lowering the efficiency of the system and making it difficult to cut the operational cost.

SUMMARY OF THE INVENTION

It is therefore an object of the present invention to provide a method of and system for auctioning off CM frame for on-air content and a method of and system for automatically sending on-air content which are intended to improve the sales efficiency and set the prices of CM frames on the basis of the market mechanism by use of communication networks.

It is another object of the present invention to provide an on-air content automatic sending method and an on-air content automatic sending system which are capable of setting prices of CM frames on the basis of the market mechanism and minimizing the operational cost involved with broadcasting while maximizing sales profit.

In carrying out the invention and according to a first aspect thereof, there is provided an on-air content CM frame auction method of determining a provider of a CM frame of on-air content for broadcasting organized by a combination of a program frame in which program content is incorporated and the CM frame in which commercial content is incorporated, the provider of the CM frame being determined by an auction based on a communication network, the method comprising: a first step in which an auctioneer notifies an auction tenderer of an auction of the CM frame via the communication network; a second step in which, when the auction tenderer sends at least auction application information indicative of an auction application price of the CM frame to the auctioneer via the communication network, the auctioneer accepts the auction application information; a third step in which the auctioneer discloses information associated with an auction application status to the auction tenderer via the communication network; and a fourth step in which, at least on the basis of an auction application price, the auctioneer determines an auction successful tenderer of the CM frame as the provider.

According to the above-mentioned method, the auction of CM frames is executed via a communication network, so that the successful tenderer of the auction and the provider of an auctioned CM frame can be determined quickly and easily. For plural CM frames in the same on-air content, the auction tenderer checks for competitive providers including providers of the same kind of industry and adjusts the alignment of the CM frames. Consequently, the number of processes on the auctioneer side can be cut, thereby mitigating the processing load. Further, if two or more auction tenderers want a same CM frames, an optimum sale price can be quickly and easily set by the auction based on a communication network.

Preferably, the auction based on the communication network is executed by applying a Web page capability of the Internet.

According to the above-mentioned method, the application of the Web page capability of the Internet allows the simple, quick, and low cost data transfer, between the auctioneer and the entity desiring the provision (sponsor), including a notification of the invitation to auction tender from the auctioneer and the sending of auction application data.

Preferably, the auction based on the communication network is executed by applying the web page capability and electronic mail capability of the Internet.

According to the above-mentioned method, the application of the electronic mail capability allows the sending of the notice of auction invitation from the auctioneer to only selected sponsors and the application of the Web page capability of the Internet allows the simple, quick and low cost data transfer, between the auctioneer and the sponsor, including the sending of auction application data from the sponsor.

Preferably, an auction tender of the CM frame is executed even at broadcasting of the on-air content and the third step is configured to include processing for capturing information associated with a reaction of an audience during the broadcasting and immediately disclosing the captured information to the auction tenderer via the communication network.

According to the above-mentioned method, the auction of CM frames is executed even at broadcasting of on-air content and the information associated with the reaction of an audience during broadcasting is immediately disclosed to the auction tenderer, thereby setting the auction price suitable for the market mechanism with the reaction the of audience reflected.

In carrying out the invention and according to a second aspect thereof, there is provided an on-air content CM frame auction system for determining a provider of a CM frame of on-air content for broadcasting organized by a combination of a program frame in which program content is incorporated and the CM frame in which commercial content is incorporated, the provider of the commercial frame being determined by an auction based on a communication network, the system comprising: a communication network for intermediating in information transfer between an auctioneer of an auction of the CM frame and an auction tenderer who desires to provide the CM frame; first means for managing processing associated with the auction of the commercial frame to be executed via the communication network and processing for determining the provider; second means for transmitting by the auctioneer information associated with a tender of the CM frame to the auction tenderer via the communication network; and third means for, when at least auction application information indicative of an auction application price of the CM frame is transmitted from the auction tenderer who accepted the information associated with the tender to the auctioneer via the communication network, determining by the auctioneer who accepted the auction application information an auction successful tenderer of the CM frame as the provider at least on the basis of the auction application price; the second means including processing for disclosing information associated with an auction application status to the auction tenderer via the communication network.

According to the above-mentioned configuration, the auction of CM frames is executed via a communication network, thereby quickly and easily determining a successful tenderer and a sponsor of a CM frame. For plural CM frames in the same on-air content, the disclosure of the information associated with an auction application status allows the auction tenderer to check for competitive sponsors including sponsors of the same kind of industry, and to adjust the alignment of the CM frames. Consequently, the number of processes on the auctioneer side can be cut, thereby mitigating the processing load. Further, if two or more auction tenderers want a same CM frames, an optimum sale price can be quickly and easily set by the auction based on a communication network.

Preferably, the auction based on a communication network is executed by applying a web page capability of the Internet.

According to the above-mentioned configuration, the information transfer between the auctioneer and the auction tenderer including the transmission of tender information from the auctioneer to the tenderer and the transmission of auction application information from the tenderer can be executed simply, quickly and inexpensively.

Preferably, the auction based on the communication network is executed by applying the Web page capability and electronic mail capability of the Internet.

According to the above-mentioned configuration, the application of the electronic mail capability allows the sending of auction information from the auctioneer to only selected tenderers and the application of the Web page capability of the Internet allows the simple, quick and low cost data transfer, between the auctioneer and the tenderers, including the sending of auction application information from the tenderers.

Preferably, the first through third means are operated even at broadcasting of the on-air content, and the second means is configured to include processing for capturing information associated with a reaction of an audience during the broadcasting and immediately transmitting the captured information to the auction tenderer via the communication network.

According to the above-mentioned configuration, the auction of CM frames is executed even at broadcasting of on-air content and the information associated with the reaction of an audience during the broadcasting is transmitted in real time to the auction tenderer, there by setting an auction price suitable for the market mechanism with the reaction of the audience reflected.

In carrying out the invention and according to a third aspect thereof, there is provided an on-air content automatic sending method of sending on-air content for broadcasting organized by a combination of a program frame in which program content is incorporated and the CM frame in which commercial content is incorporated, the method comprising: a first step in which, in order to determine a provider of the CM frame by an auction via a communication network, an auctioneer of the auction notifies an auction tenderer of the auction of the CM frame via the communication network; a second step in which, when the auction tenderer sends at least an auction application indicative of an auction application price of the CM frame to the auctioneer via the communication network, the auctioneer accepts the auction application; a third step in which the auctioneer discloses information associated with an auction application status to the auction tenderer via the communication network; a fourth step in which the auctioneer determines an auction successful tenderer of the CM frame as the provider at least on the basis of the auction application price; a fifth step in which commercial content to be incorporated in the CM frame is set on the basis of a specification by the provider; and a sixth step in which the set commercial content is incorporated in the CM frame to organize the on-air content for transmission.

According to the above-mentioned method, the auction of CM frames is automatically executed via a communication network, thereby quickly and easily determining a successful tenderer and a sponsor of a CM frame. For plural CM frames in the same on-air content, the disclosure of the information associated with an auction application status to the auction tenderers allows the tenderers to check for competitive sponsors including sponsors of the same kind of industry, and to adjust the alignment of the CM frames. Consequently, the number of processes on the auctioneer side can be cut, thereby mitigating the processing load. Further, if two or more auction tenderers want a same CM frames, an optimum sale price can be quickly and easily set by the auction based on a communication network, automatically.

Further, the organization and sending of the on-air content with commercial content incorporated are automated in addition to the automation of the auction of CM frames.

Preferably, in at least the first through third steps, the application of a Web page capability of the Internet is included.

According to the above-mentioned method, in at least the first through third steps, the application of the Web page capability of the Internet allows the information transfer between the auctioneer and the auction tenderer simply, quickly, and inexpensively.

Preferably, in at least the first through third steps, the application of the web page capability and electronic mail capability of the Internet is included.

According to the above-mentioned method, the application of the electronic mail capability to the first step allows the notice of the auction only to desired tenderers and the information transfer in the second and third steps can be executed simply quickly, and inexpensively by the application of the Web page capability of the Internet.

Preferably, the first through sixth steps are executed even at broadcasting of the on-air content and the third step is configured to include processing for capturing information associated with the reaction of an audience during the broadcasting and immediately disclosing the captured information to the auction tenderers via the communication network.

According to the above-mentioned method, the auction of CM frames is executed even at broadcasting of on-air content and the information associated with the reaction of an audience during the broadcasting is disclosed in real time to the auction tenderer, thereby setting an auction price suitable for the market mechanism with the reaction of the audience reflected.

In carrying out the invention and according to a fourth aspect thereof, there is provided an on-air content automatic sending system for sending on-air content for broadcasting organized by a combination of a program frame in which program content is incorporated and the CM frame in which commercial content is incorporated, the system comprising: auction execution means for determining a provider of the CM frame by an auction to be executed via a communication network; automatic sending means for automatically sending on-air content; and automatic management means for managing at least either an operation of the auction execution means or an operation of the automatic sending means, the auction execution means comprising: first means for notifying by an auctioneer an auction tenderer of an auction of the CM frame via the communication network; second means for, when the auction tenderer sends at least an auction application indicative of an auction application price of the CM frame to the auctioneer via the communication network, the auctioneer accepts the auction application; third means in which the auctioneer discloses information associated with an auction application status to the auction tenderer via the communication network; and fourth means in which the auctioneer determines an auction successful tenderer of the CM frame as the provider at least on the basis of the auction application price; the automatic sending means comprising: fifth means in which, on the basis of a specification by the provider, commercial content is incorporated in the CM frame to organize the on-air content for transmission.

According to the above-mentioned configuration, the auction of CM frames is automatically executed via a communication network, thereby quickly and easily determining a successful tenderer and a sponsor of a CM frame. For plural CM frames in the same on-air content, the disclosure of the information associated with an auction application status to the auction tenderers allows the tenderers to check for competitive sponsors including sponsors of the same kind of industry, and to adjust the alignment of the CM frames. Consequently, the number of processes on the auctioneer side can be cut, thereby mitigating the processing load. Further, if two or more auction tenderers want a same CM frames, an optimum sale price can be quickly and easily set by the auction based on a communication network, automatically.

Further, the organization and sending of the on-air content with commercial content incorporated are automated in addition to the automation of the auction of CM frames.

Preferably, the auction execution means includes the application of a web page capability of the Internet.

According to the above-mentioned configuration, in at least the first through third means, the application of the Web page capability of the Internet allows the information transfer between the auctioneer and the auction tenderer simply, quickly, and inexpensively.

Preferably, said auction execution means includes the application of the Web page capability and electronic mail capability of the Internet.

According to the above-mentioned configuration, the application of the electronic mail capability to the first means allows the notice of auction only to desired tenderers and the information transfer in the second and third means can be executed simply, quickly, and inexpensively by the application of the Web page capability of the Internet.

Preferably, at least the auction execution means operates even at broadcasting of the on-air content and the third means is configured to include processing for capturing information associated with the reaction of an audience during the broadcasting and immediately disclosing the captured information to the auction tenderer via the communication network.

According to the above-mentioned configuration, the auction of CM frames is executed even at broadcasting of on-air content and the information associated with the reaction of an audience during the broadcasting is disclosed in real time to the auction tenderer, thereby setting an auction price suitable for the market mechanism with the reaction of the audience reflected.

BRIEF DESCRIPTION OF THE DRAWINGS

These and other objects of the invention will be seen by reference to the description, taken in connection with the accompanying drawing, in which:

FIG. 9 illustrates an exemplary screen for disclosing CM frame auction information;

FIG. 10 illustrates an exemplary screen associated with auction application input;

FIG. 11 is illustrates an exemplary screen associated with the a successful tender notice;

DETAILED DESCRIPTION OF THE PREFERRED EMBODIMENTS

This invention will be described in further detail by way of example with reference to the accompanying drawings. It should be noted that the embodiments to be described are only parts of preferred examples for the purpose of illustrating the essential configuration and function of the present invention. Therefore, these embodiments have various limitations which are preferable in technological configuration. However, it will be apparent to those skilled in the art that the scope of the present invention is not limited to these embodiments unless otherwise noted.

Figure 1:
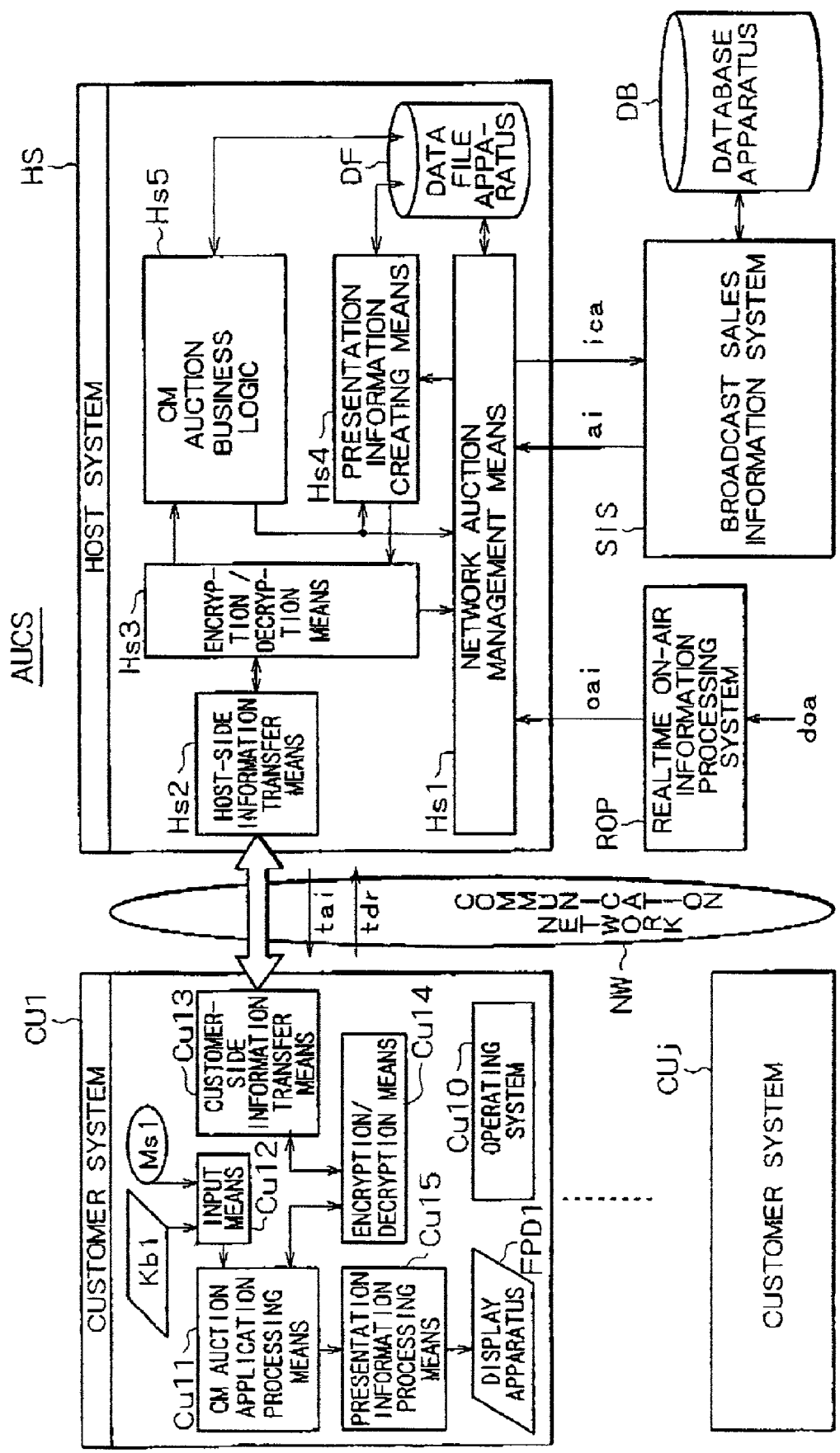
FIG. 1 is a block diagram illustrating an on-air content commercial (CM) frame auction system practiced as one embodiment of the invention.

Now, referring to FIG. 1, there is shown a block diagram illustrating an on-air content commercial (CM) frame auction system practiced as one embodiment of the invention. The following describes the configuration of this system with reference to FIG. 1.

An auction system AUCS of CM frames of on-air content associated with the present embodiment is constituted by a host system HS, a broadcast sales information system SIS, a database apparatus DB, realtime on-air information processing system ROP, and a communication network NW to which the host system HS and two or more customer systems CU1 through CUj can be connected for information transfer therebetween, thereby forming a distributed system in which information transmission and processing are executed through the network NW.

The host system HS, the broadcast sales information system SIS, the database apparatus DB, and the realtime on-air information processing system ROP constitute a platform of an auctioneer of the CM frames and are implemented by the operation of a computer system based on a mainframe computer, a work station, a server, and a personal computer for example. These systems and apparatuses are configured by plural computer devices interconnected through an intranet or a LAN or physically built in a single unit of a computer to form a multi-platform configuration as a whole.

The realtime on-air information processing system ROP is indispensable for a realtime auction in which a CM frame auction is performed in parallel with content broadcast.

As described above, the CM frame auction system AUCS is built as a distributed computer system for transmitting information through the communication network NW. The communication network NW is a two-way network such as a dedicated line, a public switched line, a cable TV network, or a combination of a communication satellite network and a public switched line for example to which a point-to-point line system or a direct link system or a packet network communication configuration capable of open-network multicasting can be applied. It should be noted that the configuration based on the packet network application will be detailed later with the descriptions of a second, third, or fourth embodiment based on the Internet.

The host system HS comprises network auction management means Hs1 for managing and controlling the entire host system HS, host-side information transfer means Hs2 which functions as an interface with the communication network NW to transfer information with the side of a customer system CUj (j is customer identifying information), encryption/decryption means Hs3 for encrypting and decrypting information to be transmitted, presentation information creating means Hs4 for creating data which carry screens, audio (GUI data), and transmitted information to be presented on the customer side, CM auction business logic Hs5 which functions as an application program executing an auction, and a data file apparatus DF which records data and also functions as a working memory.

Obviously, the host system HS, configured as a computer system, also has components such as a processor (CPU), memory devices such as RAM and ROM, an input/output IF (interface), and a bus, all not shown. Because these components form the components for general-purpose computer systems, the description thereof will be skipped in the interest of brevity.

The network auction management means Hs1, prepared as a computer program, receives auction information ai from the broadcast sales information system SIS and realtime on-air information (audience rate) oai from the realtime on-air information processing system ROP. In addition, the network auction management means Hs1 records/reproduces information on the data file apparatus DF and supplies control signals including a trigger signal to the host-side information transfer means Hs2, the encryption/decryption means Hs3, the presentation information creating means Hs4, and the CM auction business logic Hs5. Moreover, the network auction management means Hs1 sends auction results to the broadcast sales information system SIS as content organization information ica.

The host-side information transfer means Hs2 comprises a data line terminal device such as a modulator/demodulator (modem) for modulating/demodulating signals received from the communication network NW and a control program for this terminal device and inputs/outputs resultant data with the encryption/decryption means Hs3. Also, the host-side information transfer means Hs2 sends the encrypted data carrying tender information tai supplied from the encryption/decryption means Hs3 to the customer system CUj via the communication network NW and receives encrypted data carrying auction application information tdrn from the subscribing customer system CUn via the communication network NW, outputting the supplied data to the encryption/decryption means Hs3.

The encryption/decryption means Hs3, prepared as a computer program, executes the authentication of a login session for example and the security of transmitted data on the basis of a public key encryption method (using different pieces of key information for encryption and decryption) based on an asymmetric cryptosystem such as RAS or a private key encryption method such as DEA or IDEA. In the security of transmitted information, tender information tai and successful tender information supplied from the presentation information creating means Hs4 are encrypted and outputted to the host-side information transfer means Hs2 and the data supplied from the host-side information transfer means Hs2 are decrypted and the resultant auction application information tdrn is supplied to network auction management means HS1 and the CM auction business logic Hs5.

The presentation information creating means Hs4, prepared as a computer program, creates information for presenting tender information tai and successful tender information by referencing the data recorded on the data file apparatus DF on the basis of the information supplied from the network auction management means Hs1 and the CM auction business logic Hs5 and supplies the created information to the encryption/decryption means Hs3. In addition, the presentation information creating means Hs4 configures tender information tai and successful tender information so that they can be recorded on the data file apparatus DF.

In the above description, the tender information tai is provided as screen information which can be displayed on the side of customer system CUj. FIG. 9 is an exemplary screen for disclosing the auction information associated with CM frame. FIG. 10 is an exemplary screen associated with the inputting of auction application.

Tender information tai is provided as data for forming a screen 1200 for disclosing CM frame auction information and control data thereof and data for forming a screen 1300 associated with auction application input and control data thereof, including the following items:

- code 1201=outline of a program including tenderable CM frame;
- code 1202=indication whether a tender is going on or has ended;
- codes 1234A through 1234D=indication of CM frames;
- code 1203=past audience rate of a program and realtime audience rate at the current point of time during broadcasting of a realtime auction;
- code 1301=tender status;
- code 1302=broadcast date and time;
- code 1303=CM frame number;
- code 1304=preset lowest CM frame price;
- code 1305=sale status;
- code 1306=highest auction application price at the current point of time;
- code 1307=information about the provider of a successfully tendered adjacent frame or the provider of the highest auction application price at this point of time; and
- code 1308=tender deadline.

In addition, the screen 1300 associated with the inputting of auction application includes the following input fields for auction application:

- code 1310=client (customer) registration information input field;
- code 1311=auction application conditions input field; and
- code 1312=Apply button.

The information entered in the screen 1300 is transmitted to the host system HS as auction application information tdrj (j represents customer system identifying information). It should be noted that the movement between the screen 1200 and screen 1300 is executed by scrolling and radio button pressing, each of which is known technologies and therefore their descriptions will be skipped.

FIG. 11 is an exemplary screen associated with a successful tender notice. A screen 1400 associated with a successful tender notice includes the following items by which successful tender information is transmitted from the host system HS to the customer system CUj of the successful tenderer:

- code 1401=tender result;
- code 1410=successful tenderer registration information;
- code 1411=successful tender conditions;
- code 1412=Acknowledge button; and code 1413=Withdraw button.

It should be noted that, to the other auction applicants (tenderers) of customer systems CUj than the successful tenderer, only the tender result is sent as successful tender information and the notice of successful tender to the customer systems CUj of customers not applying to the tender is performed by the screen 1200 and screen 1300.

The CM auction business logic Hs5, prepared as a computer program, executes auction processing on the basis of auction application information tdrj supplied from the encryption/decryption means Hs3, records the processing result to the data file apparatus DF, and outputs the processing result to the presentation information creating means Hs4 as tender information tai. Also, the CM auction business logic Hs5 reads the processing result from the data file apparatus DF to execute successful tender processing and time-over/withdrawal processing. The results of these processing operations are recorded to the data file apparatus DF. It should be noted that the details of the CM auction business logic Hs5 will be described later.

The broadcast sales information system SIS sets a CM frame subject to auction on the basis of sales information, supplies the auction information ai thereof to the host system HS, receives content organization information ica from the host system HS, and sends the received information to the database apparatus DB. The database apparatus DB records the received content organization information ica to a hard magnetic disk apparatus for example.

The realtime on-air information processing system ROP organizes realtime on-air information oai by receiving on-air status data doa associated with realtime broadcast, audience rate for example, and supplies the organized realtime on-air information to the host system HS. The on-air status data doa are collected separately by the realtime on-air information processing system ROP or provided by an external institution.

Also, it is practicable for some CM auctions not to use realtime on-air information oai. In this case, the realtime on-air information processing system ROP is not required. Further, the portion of the host system HS which receives and processes realtime on-air information oai can be omitted.

On the other hand, each customer system CUj connectible to the communication network NW functions as the side of responding a CM frame tender invitation, forms the platform of the customer side, and is implemented by a computer system such as a personal computer, a workstation, or a terminal apparatus. In addition, a PDA (Personal Digital Assistant) or a mobile phone may be applied to the customer system CUj. The following describes the functional configuration of customer system CUj on a module basis by use of the customer system CU1 for example.

An operating system Cu10 is a software module for controlling the operation of this platform. CM auction application processing means Cu11 is a software module for executing the processing associated with the auction application of a CM auction. Input means Cu12 is a module for receiving signals from an inputting device such as a keyboard Kb and a mouse Ms and supplies the received signals to the CM auction application processing means Cu11. Customer-side information transfer means Cu13 is a module composed of a device and software for receiving signals supplied via the network NW and supplying the received signals to the CM auction application processing means Cu11, or for transmitting signals based on the processing results of the CM auction application processing means Cu11 to the network NW.

Encryption/decryption means Cu14 is a software module which, at the time of signal reception, decrypts a signal received by the customer-side information transfer means Cu13 to restore tender information tai and output the restored tender information to the CM auction application processing means Cu11 and, at the time of signal transmission, encrypts the auction application information tdr1 created by the CM auction application processing means Cu11 to output the encrypted information to the customer-side information transfer means Cu13.

Presentation information processing means Cu15 is a software module which receives screen information from the CM auction application processing means Cu11 to form a screen display signal and supplies this screen display signal to a display device Fpd to display a screen. The customer system Cuj is constituted by the above-mentioned modules.

The on-air content CM frame auction system AUCS operates in any of the following operation modes:

(1) A mode in which the broadcast sales information system SIS issues auction information ai and sends it to the host system HS.

(2) A mode in which the realtime on-air information processing system ROP receives on-air status data (for example, realtime audience rate) doa and sends realtime on-air information oai based on the received data doa to the host system HS. In the case of a CM auction which does not use realtime on-air information oai does not require this mode.

(3) A mode in which the host system HS receives auction information ai and realtime on-air information oai to issue an event corresponding to a CM frame subject to auction and sends tender information tai to all customer systems CUj for auction application invitation.

(4) A mode in which customer systems CUn desiring to participating the auction, of the customer systems CuJ which have received the tender information tai, create the auction application information tdrn for the event (CM frame) to send the created auction application information to the host system HS.

Figure 6:
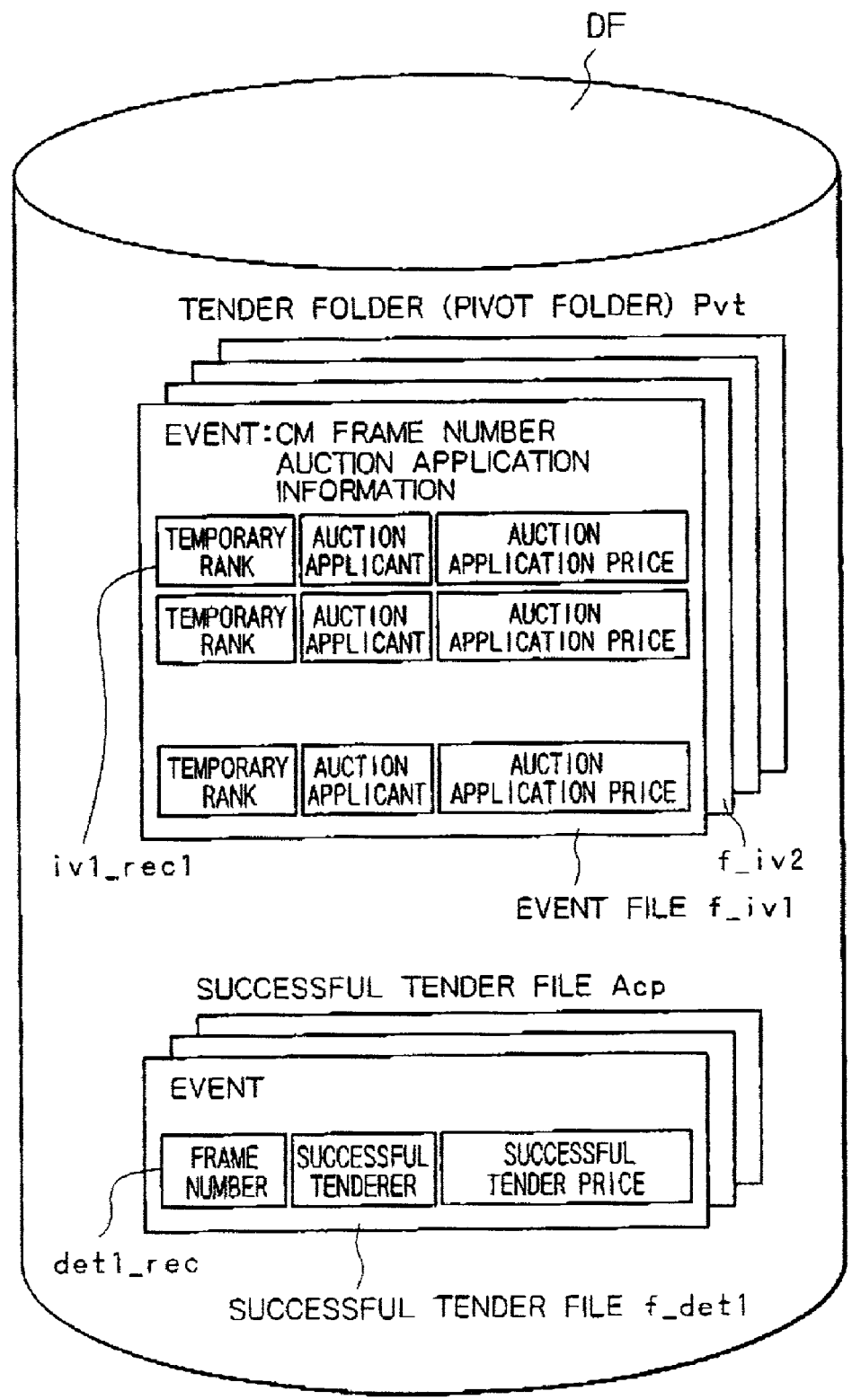
FIG. 6 is a schematic diagram illustrating a configuration of a data file apparatus shown in FIG. 1.

(5) A mode in which the host system HS receives auction application information tdrn to update an event file f_ivk (k corresponds to the number of the issued event) shown in FIG. 6 and temporary ranking information and sends the updated temporary ranking information to all customer systems CUj.

(6) A mode in which the host system HS closes the tender when the tender deadline has been reached and determines a successful tenderer of each event to make an acknowledgement with the customer system CUn of the successful tenderer.

(7) A mode in which successful tender is acknowledged or withdrawn.

(8) A mode in which, upon acknowledgement of a successful tender, content organization information ica is created to be outputted to the broadcast sales information system SIS.

(9) A mode in which the broadcast sales information system SIS records content organization information ica to the database apparatus DB.

(10) A mode in which the host system HS sends successful tender information to all customer systems CUj.

Figure 2:
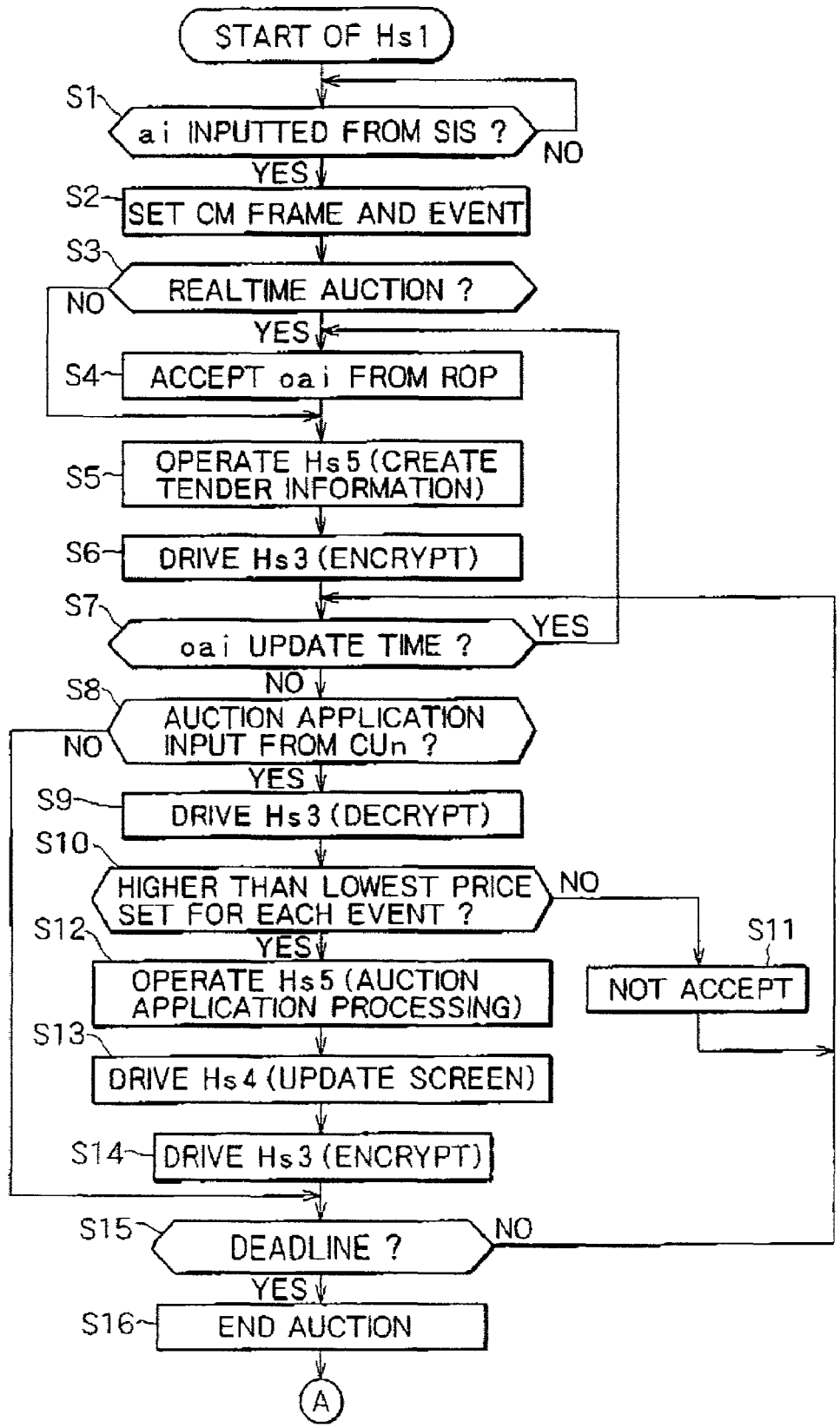
FIG. 2 is a flowchart describing an operation of the on-air content CM frame auction system of FIG. 1 (this is an operational flow of the system mainly based on network auction management means and describes an operation of an entire server SV)
Figure 3:
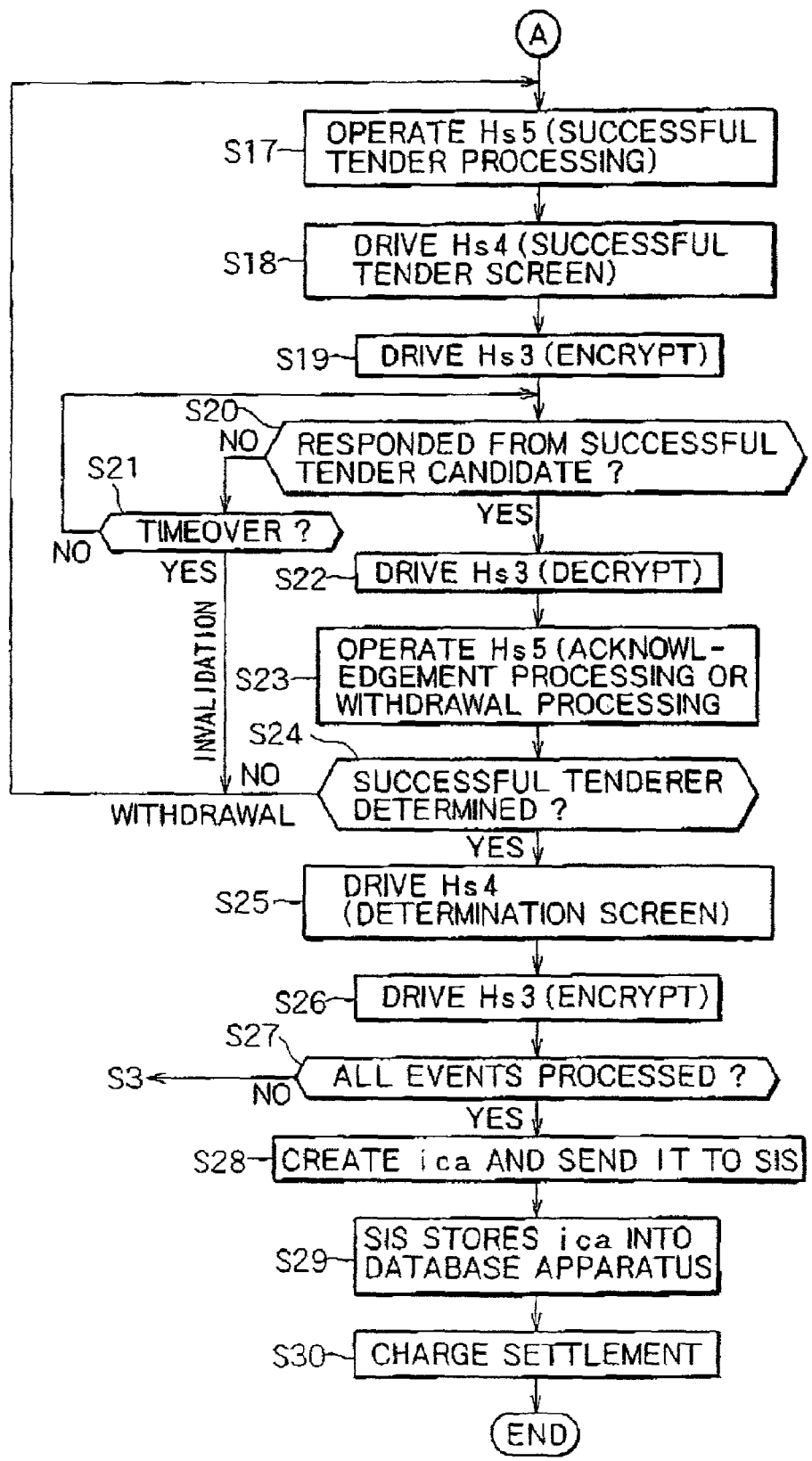
FIG. 3 is an operational flowchart continued from FIG. 2.

Each of the above-mentioned modes is executed by the operation of the on-air content CM frame auction system AUCS. FIGS. 2 and 3 are flowcharts describing the operations of the on-air content CM frame auction system AUCS. The following describes these operations with reference to these figures.

In the on-air content CM frame auction system AUCS, if a CM frame auction becomes necessary, the broadcast sales information system SIS inputs auction information ai into the network auction management means Hs1 of the host system HS.

The network auction management means Hs1 checks the broadcast sales information system SIS for the inputting of auction information ai (step S1). When the auction information ai is found, the network auction management means Hs1 sets a CM frame and an event (step S2). The network auction management means Hs1 sets an event for each CM frame subject to auction and opens an event file to which event-associated information is to be recorded in the data file apparatus DF.

Next, the network auction management means Hs1 checks if the auction is a realtime auction. If the auction is found not a realtime auction, then the procedure goes to step S5. If the action is found a realtime auction, then the network auction management means Hs1 captures realtime on-air information (audience rate) oai from the realtime on-air information processing system ROP to make an adjustment (step S4). It should be noted that when a realtime auction starts, it is assumed that on-air content is already running.

Next, the network auction management means Hs1 operates the presentation information creating means Hs4 which creates tender information tai on the basis of the content of the event file and, in the case of a realtime auction, the real-time on-air information oai (step S5). The tender information tai includes the data for forming the screen 1200 for disclosing CM frame auction information and the control data thereof and the data for the forming screen 1300 associated with the inputting of auction application and the control data thereof shown in FIGS. 9 and 10 respectively. When the tender information tai created by the presentation information creating means Hs4 is sent to the encryption/decryption means Hs3. The encryption/decryption means Hs3 encodes the received information and operates the host-side information transfer means Hs2 to send the encoded information to all or selected customer systems CUj (step S6). It should be noted that the tender information tai may be temporarily stored in the data file apparatus DF.

Then, based on the auction information ai, the network auction management means Hs1 checks whether a time of updating the realtime on-air information oai has been reached in the case of a real-time auction. If the update time has been reached, then the procedure returns to step S4. If the update time has not yet been reached, the procedure goes to step S8 (step S7). It should be noted that, if the auction is not a real-time auction, step S7 is skipped.

If, in step S8, an auction application input signal is generated via the host-side information transfer means Hs2 by the customer system CUn which has applied to the auction, then the procedure goes to step S9, in which the encryption/decryption means Hs3 decrypts the auction application input signal to restore the auction application information tdrn to be sent to the network auction management means Hs1 and the CM auction business logic Hs5. on the other hand, if no auction application input signal is found generated in step S8, the procedure goes to step S15.

Next, in step S10, on the basis of the received auction application information tdrn, the network auction management means Hs1 determines whether the tender price is lower than a lowest price (this is a given condition of the auction information ai) predetermined for each event (step S10). If the tender price is found lower than the lowest price, the tender is rejected (step S11), the procedure returning to step S7. On the other hand, if the price is higher than the lowest price, the tender is accepted and written to the event file in the data file apparatus DF, thereby triggering the CM auction business logic Hs5 (step S12).

The triggered CM auction business logic Hs5 executes auction application processing on the basis of the auction application information tdrn in step S12. The information obtained during the auction application processing may be temporarily stored in the data file apparatus DF. The result of the auction application processing is outputted to the presentation information creating means Hs4 and the event file in the data file apparatus DF is updated. The details of the auction application processing will be described later.

Next, on the basis of the inputted auction application processing result, the presentation information creating means Hs4 updates the tender information tai and outputs the updated tender information to the encryption/decryption means Hs3 (step S13). The updated tender information tai may also be temporarily stored in the data file apparatus DF.

In step S14, the encryption/decryption means Hs3 encodes the updated tender information tai and sends the updated tender information to the customer system side via the host-side information transfer means Hs2.

In step S15, the network auction management means Hs1 checks the tender deadline (which is a given condition of the auction information ai). If the tender deadline has not been reached, then the procedure returns to step S7 to update the realtime on-air information and continue the acceptance of render. Consequently, the reaction of the audience in the on-air state can be reflected on the auction price.

If the tender deadline has been reached, the auction is closed, thereby closing the event file in the data file apparatus DF (step S16).

Next, in step S17, the network auction management means Hs1 sends a control signal for starting successful tender processing to the CM auction business logic Hs5. Receiving the control signal, the CM auction business logic Hs5 references the event file in the data file apparatus DF, starting the successful tender processing. It should be noted that the details of the successful tender processing will be described later.

In the successful tender processing in step S17, the host system HS determines an auction applicant who has presented the highest price of all auction applicants as a successful tender candidate, so that the final successful tenderer is determined through acknowledgement of the auction applicant shown in the following steps.

The result of the successful tender processing by the CM auction business logic Hs5 is sent to the presentation information creating means Hs4, which creates the information of successful tender notice (step S18). The information of successful tender notice includes the data for forming the screen 1400 associated with successful tender notice and the control data thereof. The presentation information creating means Hs4 sends the information of successful tender notice to the encryption/decryption means Hs3, the encryption/decryption means Hs3 encodes the received information, and the host-side information transfer means Hs2 is operated to send the encoded data to the customer system CUn of the successful tenderer (step S19). Consequently, the successful tender information is transmitted from the host system HS to the customer system CUn. It should be noted that the presentation information creating means Hs4 may also temporarily store the successful tender information in the data file apparatus DF.

Subsequently, the network auction management means Hs1 waits for a response from the customer system CUn, which is the successful tender candidate (step S20). In this standby state, a time-over check is executed (step S21), thereby forming a standby loop. If a time-over is detected in the standby state, the network auction management means Hs1 regards this as the cancellation of this successful tender and invalidates this tender, deleting the auction application data of the successful tender candidate CUn from the event file in the data file apparatus DF. Then, the procedure returns to step S17, in which a next successful tender candidate CUn' is determined.

If, in step S20, a response comes from the customer system CUn, which is the successful tender candidate, via the host-side information transfer means Hs2, then the procedure goes to step S22, in which the encryption/decryption means Hs3 decrypts the response information and sends the decrypted response information to the CM auction business logic Hs5.

In step S23, the CM auction business logic Hs5 executes acknowledge processing or withdrawal processing on the basis of the received response information. If the successful tender candidate CUn has acknowledged the successful tender, then this candidate CUn is determined as the final successful tenderer, which is recorded to the successful tender file of that event in the data file apparatus DF. The information about the final determination of the successful tenderer is sent to the network auction management means Hs1. If the successful tender candidate CUn withdraws, withdrawal processing information is sent to the network auction management means Hs1.

In step S24, when withdrawal processing information comes from the CM auction business logic Hs5, the network auction management means Hs1 deletes the auction application data of that successful tender candidate CUn from the event file in the data file apparatus DF like the above-mentioned invalidation processing for time-over, upon which the procedure returns to step S17 to determine a next successful tender candidate CUn'. On the other hand, when the information telling the determination of the final successful tenderer comes, the network auction management means Hs1 sends a control signal to the presentation information creating means Hs4, upon which the procedure goes to step S25.

In step S25, on the basis of the control signal supplied from the network auction management means Hs1, the presentation information creating means Hs4 accesses the successful tender file of that event in the data file apparatus DF, creates a determination screen data, and sends it to the encryption/decryption means Hs3.

Next, in step S26, the encryption/decryption means Hs3 encodes (encrypts) the determination screen data and sends the encoded data to the customer system via the host-side information transfer means Hs2.

When the successful tenderer of that event has been determined as described above, the network auction management means Hs1 confirms in step S27 whether the auctions for all events have been completed. If there is any events remaining for tender, the procedure returns to step S3 to repeat the above-mentioned processing operations. If all events have been completed, the procedure goes to step S28.

When the successful tenderers of all events have been determined as described above, the network auction management means Hs1 organizes content organization information ica by referencing the successful tender files of all events in the data file apparatus DF and sends the content organization information ica to the broadcast sales information system SIS (step S28). The broadcast sales information system SIS stores the received content organization information ica into the database apparatus DB (in step S29). Further, the broadcast sales information system SIS performs post-processing such as charge settlement processing after broadcasting the on-air content (step S30). The post-processing also includes the application of penalties to the cancellation due to the withdrawal made in step S24 and penalty billing processing.

Figure 4:
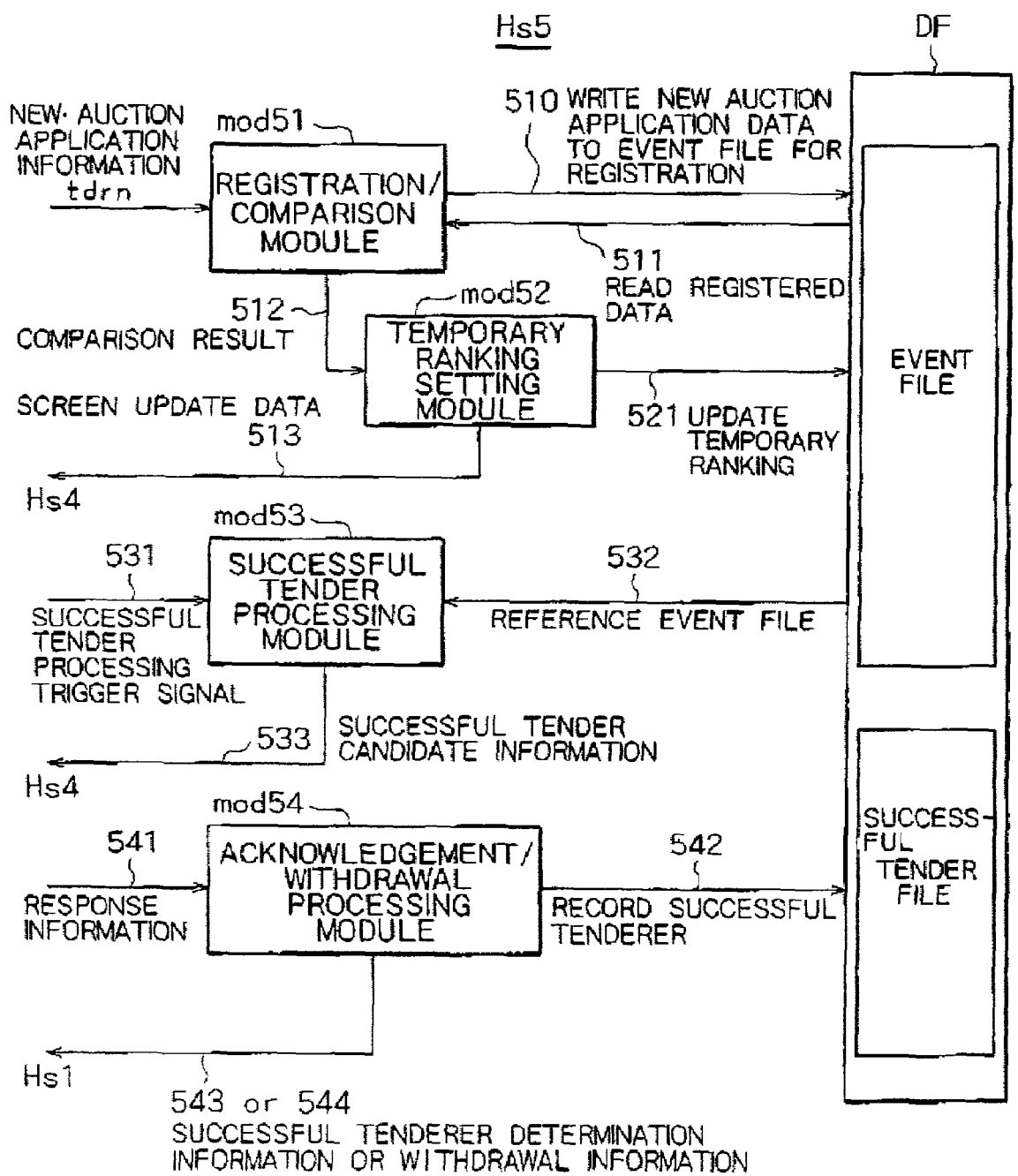
FIG. 4 is a block diagram illustrating a CM auction business logic shown in FIG. 1.
Figure 5:
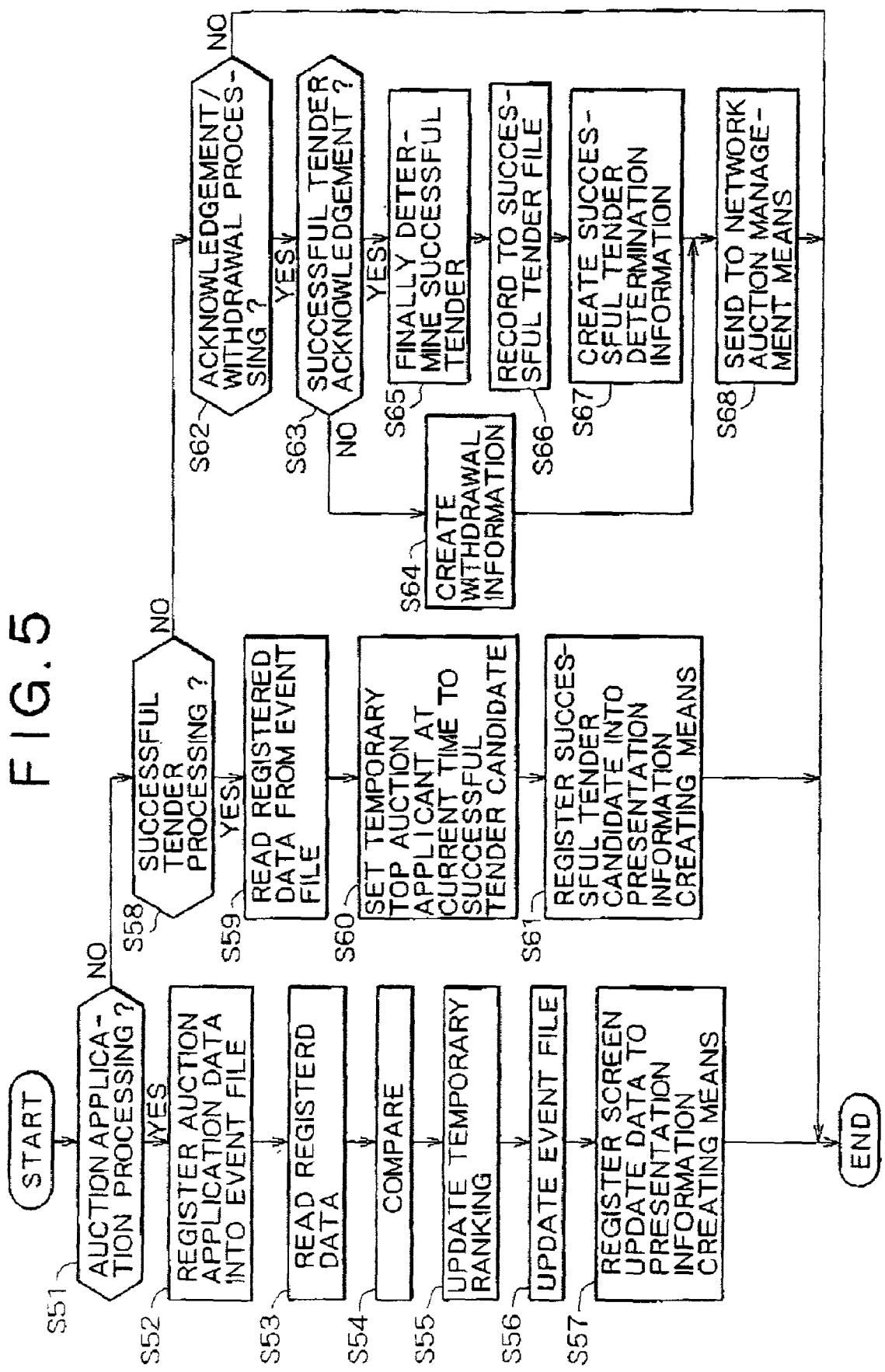
FIG. 5 is an operational flowchart of the CM auction business logic shown in FIG. 1.

FIG. 4 illustrates a functional configuration of the CM auction business logic Hs5 shown in FIG. 1. FIG. 5 is a flowchart describing the operation of the CM auction business logic Hs5.

The CM auction business logic Hs5 is composed of the following software modules. Namely, a registration/comparison module mod51 for the registration and comparison of auction application information, a temporary ranking setting module mod52 for setting the temporary ranking of auction application, a successful tender processing module mod53 for determining a successful tender candidate from among auction applications, and a acknowledgement/withdrawal processing module mod 54 for performing acknowledgement or withdrawal depending on the response by a successful tender candidate.

Receiving the new auction application information tdrn of an event, the registration/comparison module mod51 executes a write registration (510) of the new auction application data into the corresponding event file, performs reading (511) of the registered data from the event file, and compares the auction application price, sending a comparison result (512) to the temporary ranking setting module mod52. On the basis of the received comparison result (512), the temporary ranking setting module mod52 updates the temporary ranking of all auction applicants currently registered in the event file, writing an updated temporary ranking (521) to the event file to update the same. Further, the temporary ranking setting module mod52 outputs screen update data (513) to the presentation information creating means Hs4.

The successful tender processing module mod53 starts upon reception of a successful tender processing trigger signal (531) from the network auction management means Hs1, sets the auction applicant of whose temporary ranking is top as a successful tender candidate by performing reference (532) on the event file, and outputs information (533) of this successful tender candidate to the presentation information creating means Hs4.

On the basis of response information (541) of the successful tender candidate supplied from the encryption/decryption means Hs3, the acknowledgement/withdrawal processing module mod54 determines this successful tender candidate as the final successful tenderer if the successful tender is acknowledged, records the successful tenderer (542) to the successful tender file of the corresponding event, and sends successful tenderer determination information (543) to the network auction management means Hs1. In the case of withdrawal, the acknowledgement/withdrawal processing module mod54 sends withdrawal information (544) to the network auction management means Hs1.

The following describes the operation of the CM auction business logic Hs5 with reference to FIG. 5. In step S51, whether it is auction application processing or not is determined and the event is checked. If it is not auction application processing, the procedure goes to step S58. If it is auction application processing, the auction application data are registered as a new record ivn_reck into an event file f_ivn of the corresponding event in a pivot folder Pvt in the data file apparatus DF shown in FIG. 6 (step S52), each piece of existing auction application data (record ivn_recj) is read from the corresponding event file f_ivn (step S53), the auction application price of these existing auction application data are compared with the auction application price of the new record ivn_reck (step S54), the temporary ranking is updated in accordance with the result of the comparison to set a new temporary ranking (step S55), and the updated records (ivn- _recj and ivn_reck) are stored in the event file f_ivn (step S56). Consequently, the temporary top auction applicant and the new temporary ranking are recorded to the data file apparatus DF. Then, the data for screen updating are sent to the presentation information creating means Hs4 (step S57).

If it is not auction application processing in step S51, then whether it is successful tender processing is determined (step S58). If it is not successful tender processing, the procedure goes to step S62. If it is successful tender processing, the registered data are read from the event file f_ivn of the corresponding event in the pivot folder Pvt in the data file apparatus DF (step S59), the top auction applicant at the current point of time is set as a successful tender candidate (step S60), and the successful tender candidate information is sent to the presentation information creating means Hs4 (step S61).

If it is not successful tender processing in step S58, then whether it is acknowledgement processing or withdrawal processing is determined (step S62). If it is neither acknowledgement processing nor withdrawal processing, the processing flow comes to an end. If it is either acknowledgement processing or withdrawal processing, one of them is determined (step S63). If it is successful tender acknowledgement processing, the successful tender candidate is determined as a successful tenderer (step S65) and the content of a record detn_rec in a successful tender file f_detn in a successful tender folder Acp in the data file apparatus DF are recorded (step S66).

Next, successful tenderer determination information is created (step S67), which is sent to the network auction management means Hs1 (step S68).

On the other hand, if it is withdrawal processing in step S63, then the procedure goes to step S64 to create withdrawal information. Subsequently, the procedure goes to step S68. In this case, the withdrawal information is sent to the network auction management means Hs1.

The relationships between the above-mentioned processing steps and the above-mentioned modules are as follows. Steps S51 through S54 are executed by the registration/comparison module mod51, steps S55 through S57 are executed by the temporary ranking setting module mod52, steps S58 through S61 are executed by the successful tender processing module mod53, and steps S62 through S68 are executed by the acknowledgement/withdrawal processing module mod54.

FIG. 6 illustrates the configuration of the data file apparatus DF shown in FIG. 1. The data file apparatus DF has a data recording capability with a magnetic disk used as its recording medium. The tender folder Pvt and the successful tender folder Acp are recorded to the data file apparatus DF. In addition, various data associated with auction processing are recorded to the data file apparatus DF in a temporary manner.

The tender folder Pvt is a pivot folder is used to collectively register plural pieces of tender information submitted by unspecified customers and collectively manage the data for each event. This folder consists of two or more event files f_ivk (k being an event number, namely a CM frame number). Events correspond event files one to one.

Each event file f_ivk has a title which is event number or CM frame number and consists of plural records ivl_recl through ivn_recn, each record consisting of a temporary ranking field, an auction applicant field, and an auction application price field. One record is registered for each event and each auction applicant. The above-mentioned setting of successful tender candidates is executed by retrieving the auction application price fields of the records in the event files of the tender folder Pvt and comparing the retrieved auction application price. If a cancel of tender occurs, the corresponding record is deleted.

The successful tender folder Acp consists of plural successful tender files f_detk (k being event number or CM frame number) to be registered for each event. Each successful tender file f_detk records a record detk_rec which includes the information (CM frame number, successful tenderer, and successful tender price) about the final successful tenderer of that event.

The following describes the customer system side.

Figure 7:
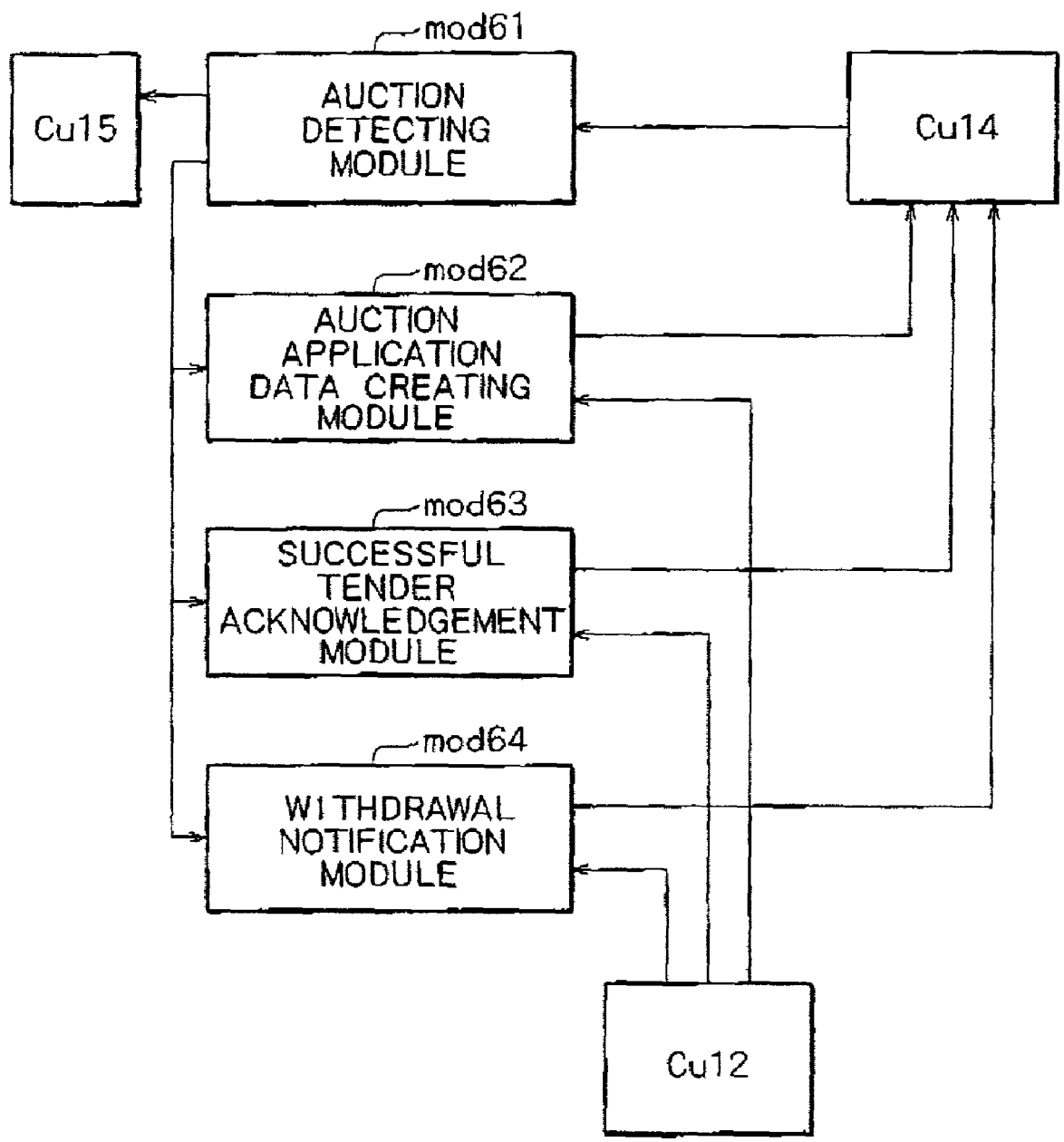
FIG. 7 is a block diagram illustrating CM auction application processing means shown in FIG. 1.

FIG. 7 illustrates the functional configuration of CM auction application processing means Cu11 in the customer system CU1 shown in FIG. 1. The CM auction application processing means Cu11 is constituted by a software program and comprises an auction detecting module mod61 for detecting auction-associated information supplied from the host system HS, an auction application data creating module mod62 for creating auction application information at the time of auction application, a successful tender acknowledgement module mod63 for acknowledging to become the successful tenderer upon reception of the confirmation of successful tender from the host system HS, and a withdrawal notification module mod64 for notifying the host system HS of the intention to withdraw from the successful tender notified from the host system HS.

The auction detecting module mod61 sends the data supplied from the encryption/decryption means Cu14 to the presentation information processing means Cu15 to display the supplied data and, if this data is tender information, sends the data to the auction application data creating module mod62 to drive the same and, if the data is successful tender acknowledgement information, sends the data to the successful tender acknowledgement module mod63 and the withdrawal notification module mod64 to drive them.

When an auction application condition is inputted by the user from the input means Cu12, the auction application data creating module mod62 creates auction application data and sends the created auction application data to the encryption/decryption means cu14.

When successful tender acknowledgement is inputted from the input means CU12, the successful tender acknowledgement module mod63 creates successful tender acknowledgement data and sends this data to the encryption/decryption means Cu14.

On the other hand, when withdrawal information is inputted from the input means Cu12, the withdrawal notification module mod64 creates withdrawal data and sends this data to the encryption/decryption means Cu14.

Figure 8:
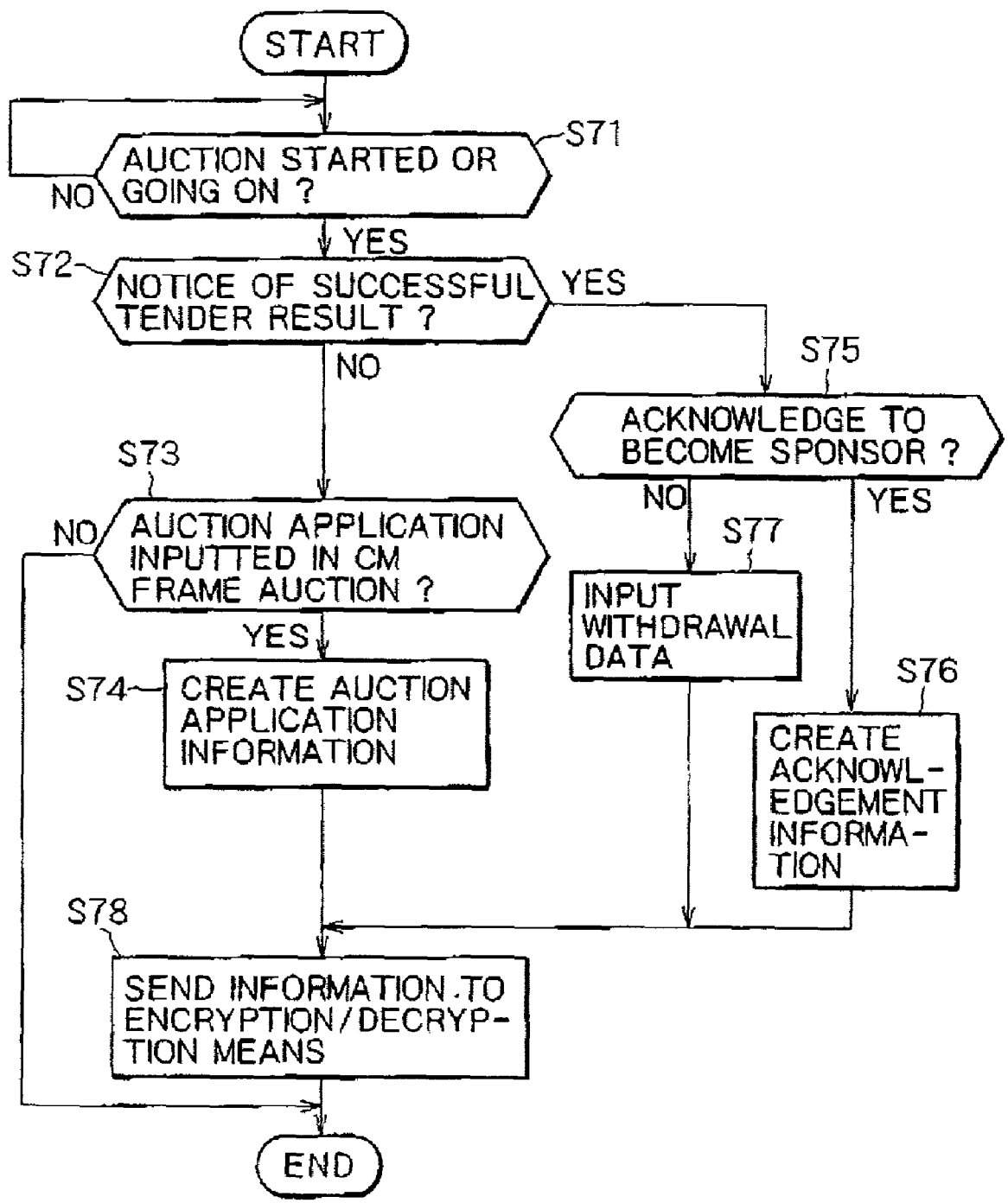
FIG. 8 is an operational flowchart of the CM auction application processing means shown in FIG. 1.

FIG. 8 is a flowchart describing the operation of the CM auction application processing means Cu11 shown in FIG. 1.

In step S71, it is determined whether an auction is started or already going on. If the decision is No, the procedure returns to START of the flowchart; if the decision is Yes, the procedure goes to step S72, in which whether it is the notification of successful tender result is determined. If the decision is No, the procedure goes to step S73; if the decision is Yes, the procedure goes to step S75.

In step S73, if it is confirmed that an auction application input is performed in the CM frame auction, then the procedure goes to step S74. In this case, the "CM frame auction information disclosing screen" 1200 shown in FIG. 9 and the "auction application input associated screen" 1300 shown in FIG. 10 are displayed by the presentation information processing means Cu15. When the user enters the client registration number into the client registration information input field 1310, which is the input field for auction application and the auction application condition into an auction application condition input field 1311 on the screen 1300, and presses the Apply button 1312, the CM auction application processing means Cu11 creates auction application information tdr1 accordingly (step S74) and sends the created information to the encryption/decryption means Cu14 (step S78). If no auction application is inputted in step S73, it is determined that the user will not participate in the auction, upon which the processing comes to an end.

On the other hand, in step S75, a "successful tender notice screen" 1400 shown in FIG. 11 is displayed by the presentation information processing means Cu15. When, by referencing this screen, the user clicks an Acknowledge button 1412 for accepting to become a sponsor or a Withdraw button 1413 for withdrawal from the tender, successful tender acknowledgement information is created (step S76) and sent to the encryption/decryption means Cu14 (step S78) or withdrawal information is created (step S77) and sent to the encryption/decryption means Cu14 (step S78).

Above-mentioned steps S71 and S72 are executed by the auction detecting module mod61, steps S74 and S78 are executed by the auction application data creating module mod62, steps S75, S76, and S78 are executed by the successful tender acknowledgement module mod63, and steps S77 and S78 are executed by the withdrawal notification module mod64.

As described above, the on-air content CM frame auction system AUCS associated with the present invention is a system for determining a sponsor of a CM frame for on-air content for broadcasting organized by a combination of a program frame in which program content is incorporated and a CM frame in which CM content is incorporated.

The communication network NW intermediates between the auctioneer (host) of a CM frame auction and auction tenderers (customers) who desire to sponsor CM frames. The network auction management means Hs1 includes a capability as first means for managing the processing associated with a CM frame auction to be performed via the communication network NW and the processing for determining sponsors. The network auction management means Hs1 and the host-side information transfer means Hs2 include a capability of second means for the host to transmit tender information and auction application status information to the customers via the communication network NW to disclose these items of information to the customers.

Further, when the auction application information presenting a tender application price is transmitted via the communication network NW by a customer who has accepted tender information, the CM auction business logic Hs5 includes a capability as third means for determining the successful tenderer of the auction of the CM frame as the sponsor on the basis of the auction application price.

The above-mentioned configuration allows the execution of CM frame auctions via the communication network and the quick and easy decision of the sponsor of each CM frame.

The disclosure of the auction application status information by the host to customers allows the customer side, for plural CM frames in the same on-air content, to check competitive sponsors including sponsors of the same kind of industry and adjust the alignment of the CM frames. Consequently, the number of processes on the host side can be cut, thereby mitigating the processing load.

Moreover, if plural customers want a same CM frame, the auction via the communication network allows the quick and easy setting of an optimum sale price.

Further, in the case of a configuration in which the first through third means of the above-mentioned configuration are operated even during the broadcasting of on-air content to make the second means capture the information associated with the reaction of audience during the broadcasting and the captured information is instantly transmitted as at least part of the tender information to customers via the communication network NW, the auction of CM frames can be performed during the broadcasting of on-air content and, by transmitting in real time the information associated with the reaction of audience during the broadcasting to customers, auction price setting based on the market mechanism which reflects the reaction of audience can be executed.

Figure 12:
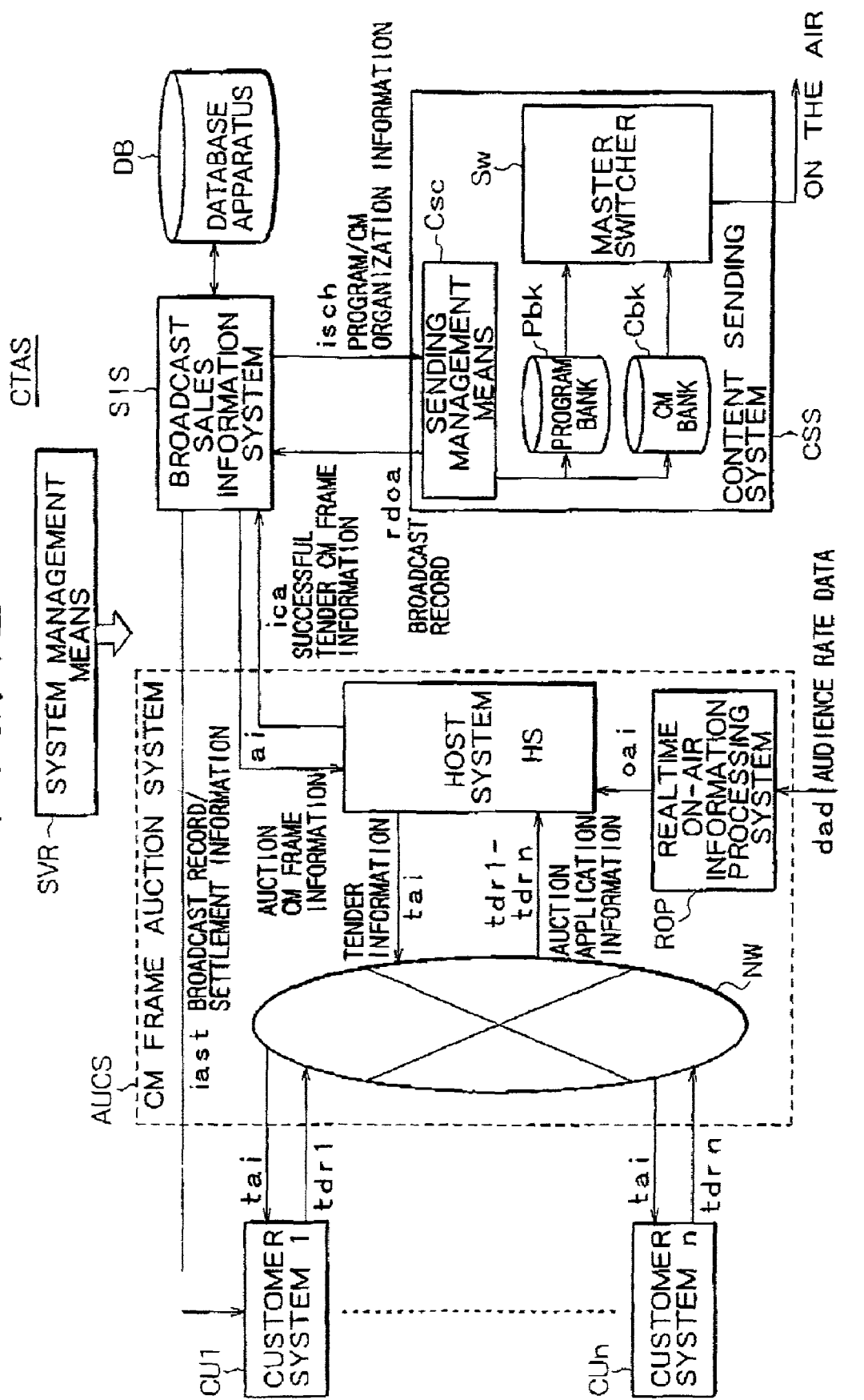
FIG. 12 is a schematic block diagram illustrating a functional configuration of an on-air content automatic sending system practiced as another embodiment of the invention.

FIG. 12 is a block diagram illustrating an on-air content automatic sending system practiced as one embodiment of the invention.

The on-air content automatic sending system CTAS comprises system management means SVR for managing whole system operations, a CM frame auction system AUCS (including a host system HS, a realtime on-air information processing system ROP, and a communication network NW), a broadcast sales information system SIS (including a database apparatus DB) and a content sending system CSS. The CM frame auction system AUCS and the broadcast sales information system SIS are substantially the same in configuration as those shown in FIG. 1. The content sending system CSS comprises sending management means, a program bank Pbk, a CM bank Cbk, and a master switcher Sw and transfers information with the broadcast sales information system SIS, thereby sending on-air content. It should be noted that the portions of the present embodiment which are identical to those of the previous embodiment are as described in the description of the previous embodiment.

The system management means SVR for managing the entire system operations triggers at least the broadcast sales information system SIS, the content sending system CSS, and the CM frame auction system AUCS at least at the time of starting the transmission of on-air content, while managing the content sending system CSS in capturing program/CM frame organization information isch from the broadcast sales information system SIS to send on-air content and the host system HS of the CM frame auction system AUCS in capturing auction CM frame information ai from the broadcast sales information system SIS and realtime on-air information oai from the realtime on-air information processing system ROP to execute a realtime auction via the communication network NW.

The sending management means Csc of the content sending system CSS captures program/CM organization information isch from the broadcast sales information system SIS as scheduling information, extracts a program film specified by the program/CM organization information isch from the program bank Pbk at a specified time, or extracts a specified CM film from the CM bank Cbk, operates the master switcher Sw according to a specified schedule, and sends the specified program film and the specified CM film, thereby forming on-air content to put it on the air.

Figure 13:
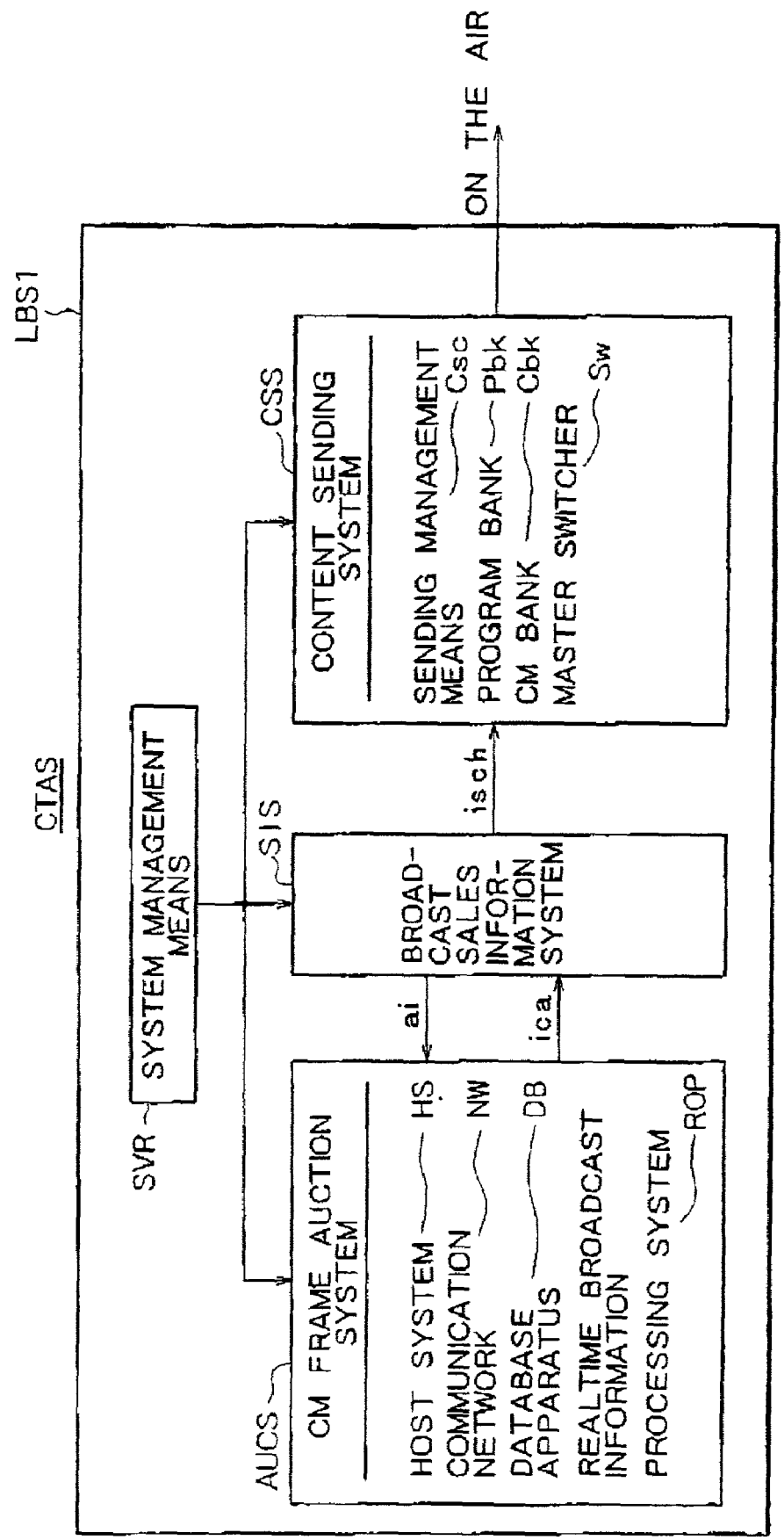
FIG. 13 illustrates a functional configuration of the on-air content automatic sending system shown in FIG. 12.

FIG. 13 illustrates a functional configuration of the on-air content automatic sending system CTAS shown in FIG. 12. FIG. 13 also shows a first business model to which the on-air content automatic sending method associated with the present invention.

Figure 14:
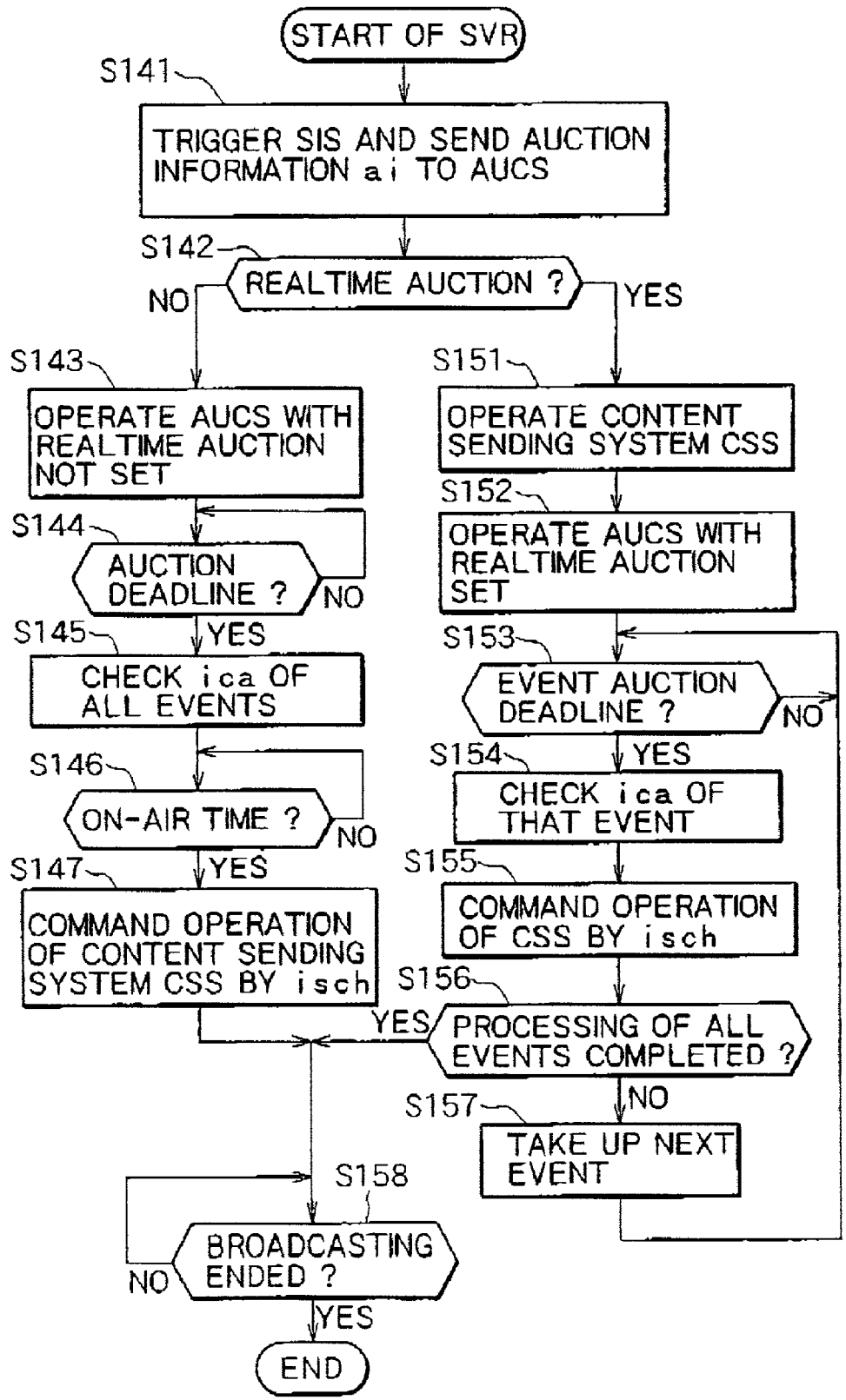
FIG. 14 is an operational flowchart of system management means shown in FIG. 12.
Figure 15:
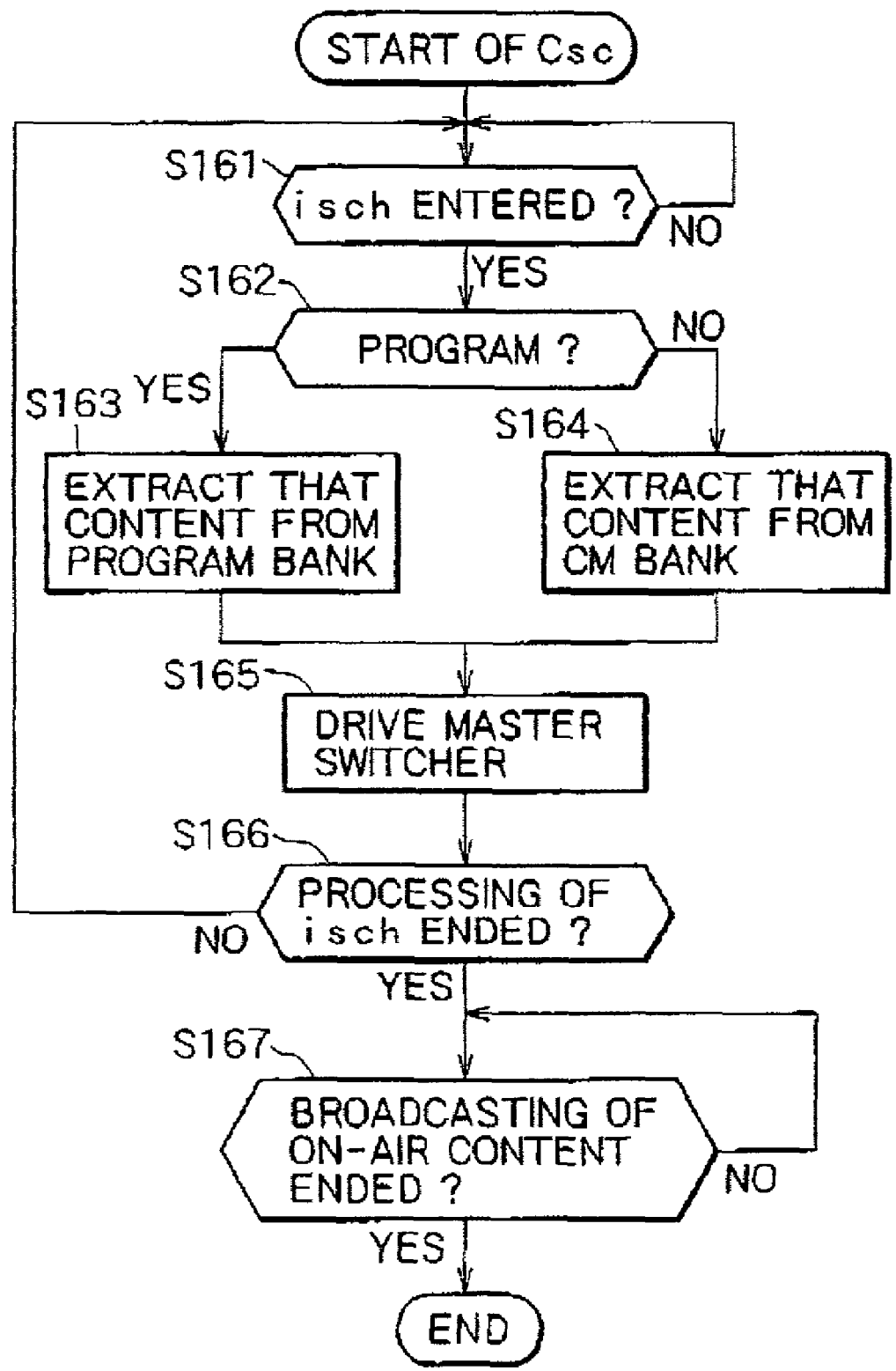
FIG. 15 is an operational flowchart of transmission management means shown in FIG. 12.

FIG. 14 is a flowchart describing the operation of the system management means SVR shown in FIG. 12. FIG. 15 is a flowchart describing the operation of the sending management means Csc shown in FIG. 12.

As shown in FIG. 13, in the on-air content automatic sending system CTAS, the system management means SVR manages the operations of the CM frame auction system AUCS, the broadcast sales information system SIS, and the content sending system CSS. The entire on-air content automatic sending system CTAS is operated as one business model by a licensed broadcaster LBS1 for example. Therefore, the licensed broadcaster LBS1 performs the auction of CM frames and the transmission of on-air content. The content sending system CSS, equivalent to broadcasting facilities, receives successful tender CM frame information ica from the CM frame auction system AUCS via the broadcast sales information system SIS or directly and performs on-air content transmission, thereby executing broadcasting. In the present business model, the licensed broadcaster LBS1 owns the broadcasting right and the copyright of content organization information.

The following describes the operation of the system management means SVR with reference to FIG. 14. The system management means SVR triggers the broadcast sales information system SIS to send auction CM frame information ai to the CM frame auction system AUCS (step S141). Next, the system management means SVR checks if the auction is a realtime auction (step S142). If the auction is found not a realtime auction, then the procedure goes to step S143, in which the CM frame auction system AUCS is operated with realtime auction not set. Consequently, the network auction management means Hs1 in the host system HS of the CM frame auction system AUCS is triggered, thereby starting the auction.

This CM frame auction is started fairly earlier than the actual broadcasting and closed before the actual broadcasting.

The system management means SVR waits in a loop until the auction is closed (step S144) and, when it is confirmed that the successful tender CM frame information ica associated with all events (CM frames) subject to auction has been prepared by the CM frame auction system AUCS and recorded to the database apparatus DB of the broadcast sales information system SIS (step S145), the system management means SVR waits in a loop until the actual broadcasting of this on-air content (step S146). When the actual broadcasting time has been reached, the system management means SVR triggers the broadcast sales information system SIS to send program/CM organization information isch to the content sending system CSS, sending an operation command to the content sending system CSS (step $147). Consequently, when the broadcasting of the on-air content begins, the system management means SVR goes to step S158, continuing the monitoring until the broadcast ends.

Thus, the non-realtime CM frame auction and the subsequent broadcasting of on-air content automatically proceed.

On the other hand, if the auction is found a realtime auction in step S142, then the procedure goes to step S151, in which an operation command is sent to the content sending system CSS to start the broadcasting of the on-air content (step S151). Thus, the broadcasting of the on-air content and the realtime auction start at the same time. However, the first portion (program frame or CM frame) of the program/CM organization information isch is predetermined before the beginning of the broadcasting of the on-air content and the content of the CM frame to appear after the beginning of the broadcasting have not yet set. Therefore, at the beginning of the broadcasting, the first predetermined portion of the program/CM organization information isch is supplied to the content sending system CSS to start the broadcasting, thereby sequentially determining the content of the subsequent CM frames by the realtime auction before their broadcasting.

Next, the system management means SVR notifies the CM frame auction system AUCS of the realtime auction to operate the CM frame auction system AUCS. Consequently, the network auction management means Hs1 in the host system of the CM frame auction system AUCS is triggered to start the realtime auction (step S152). Normally, there are two or more CM frames of which content is not yet set and the realtime auction is performed with each of these CM frames registered as one event. The auction deadlines of these events are different from one another. The CM frame auction system AUCS performs the realtime auction of each event on the basis of its deadline information. The auction deadlines of the events are also managed by the system management means SVR.

The system management means SVR waits in a loop until the auction deadline of each event comes (step S153). When the system management means SVR confirms that the successful tender CM frame information ica associated with this event is prepared by the CM frame auction system AUCS when the deadline of an event of interest comes and this information is supplied to the broadcast sales information system SIS (step S154), the system management means SVR sends the program/CM organization information isch to the content sending system CSS and sends an operation command thereto (step S155). The content sending system CSS is currently executing the broadcasting of on-air content, while updating the scheduling information on the basis of the program/CM organization information isch, continuing the broadcasting.

It should be noted that the CM content to be prepared by each successful tenderer is registered and stored in the CM bank Cbk before being put on the air.

Next, the system management means SVR checks whether all events have been processed (step S156). If there remain any events unprocessed, the system management means SVR takes up a next event in time series (step S157), returning to step S153.

On the other hand, if all events have been processed in step S156, the procedure goes to step S158 to continue the management until the end of the broadcasting of this on-air content.

Thus, the automatic sending of on-air content having a realtime CM frame auction is executed.

The following describes the operation of the sending management means Csc with reference to FIG. 15. The sending management means Csc monitors the inputting of program/CM organization information isch from the broadcast sales information system SIS (step S161), confirms which of a program or a CM is to be put on the air next on the basis of the program/CM organization information (step S162) upon inputting of the program/CM organization information isch and, if the program is to be put on the air next, extracts the program content from the program bank Pbk (step S163); if the CM is to be put on the air, the sending management means Csc extracts the CM content from the CM bank Cbk (step S164). Consequently, the CM content is incorporated in a CM frame. Then, sending management means Csc drives the switcher Sw (step S165) to select the program content or the CM content, the selected content being transmitted. Next, the sending management means Csc checks whether the processing of he program/CM organization information has been completed (step S166). If this processing has not been completed, the procedure returns to step S161. If this processing has been completed, the procedure goes to step S167, in which the broadcasting of the currently broadcast on-air content (the last program content or the last CM content) is continued until its end. When the broadcasting comes to an end, the automatic sending of the on-air content also comes to an end.

A broadcast record rdoa is sent from the sending management means Csc to the broadcast sales information system SIS. The broadcast sales information system SIS creates broadcast record/settlement information iast and sends it to the sponsor. The settlement is performed in accordance with procedure defined by the sponsor after a certain period of time.

According to the on-air content automatic sending system CTAS associated with the present invention, the automatic execution of a CM frame auction by use of a communication network can quickly and easily determine auction successful tenderers and CM frame sponsors. Further, disclosure of the information associated with auction application status to customers allows them to check, for plural CM frames in the same on-air content, for competitive sponsors including sponsors of the same kind of industry, thereby adjusting the alignment of CM frames. This leads to a cut in the number of processes on the auctioneer (host) side, thereby mitigating the processing load. Moreover, if two or more customers desire to sponsor a same CM frame, the auction based on a communication network allows the quick and easy setting of optimum sale prices.

In addition to the above-mentioned automation of CM frame auctions, the on-air content automatic sending system CTAS can automate the organization and transmission of the on-air content with CM content incorporated.

Further, capturing realtime on-air information such as the reaction of audience during broadcasting and disclosing the captured information realtime to customers via the communication network allow the continuation of a CM frame auction even during the broadcasting of on-air content and the reaction of audience to be reflected on auction prices, thereby making it be adapted to the market mechanism.

Figure 16:
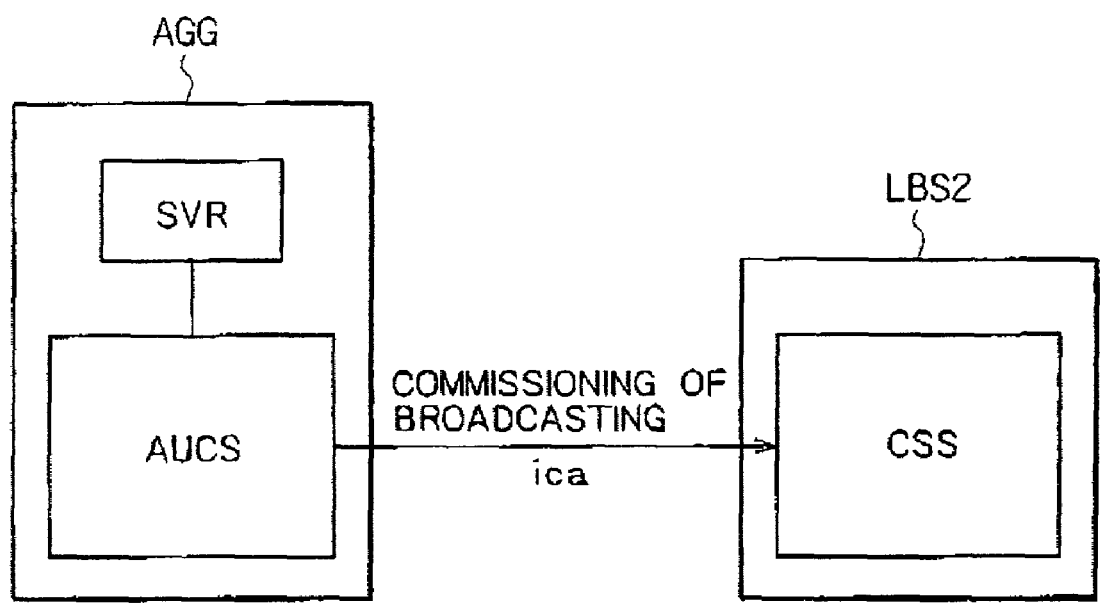
FIG. 16 illustrates a second business model to which an on-air content automatic sending method associated with the invention is applied.

FIG. 16 illustrates a second business model to which the on-air content automatic sending method according to the invention is applied. In this business model, different concerns, namely a commissioning broadcasting concern and a contractor broadcasting concern each participate.

A commissioning broadcasting concern AGG owns the broadcasting right of content and operates the CM frame auction system AUCS and the system management means SVR for managing it as an on-air content organization concern. Content organization information ica, which is a result of this operation, is subject to a copyright, which is owned by the commissioning broadcasting concern AGG. Next, on the basis of this content organization information ica, the broadcasting is commissioned to a licensed broadcaster LBS2 which operates the content sending system CSS (broadcasting facilities). The licensed broadcaster LBS2 broadcasts the commissioned on-air content as a contractor broadcasting concern.

Figure 17:
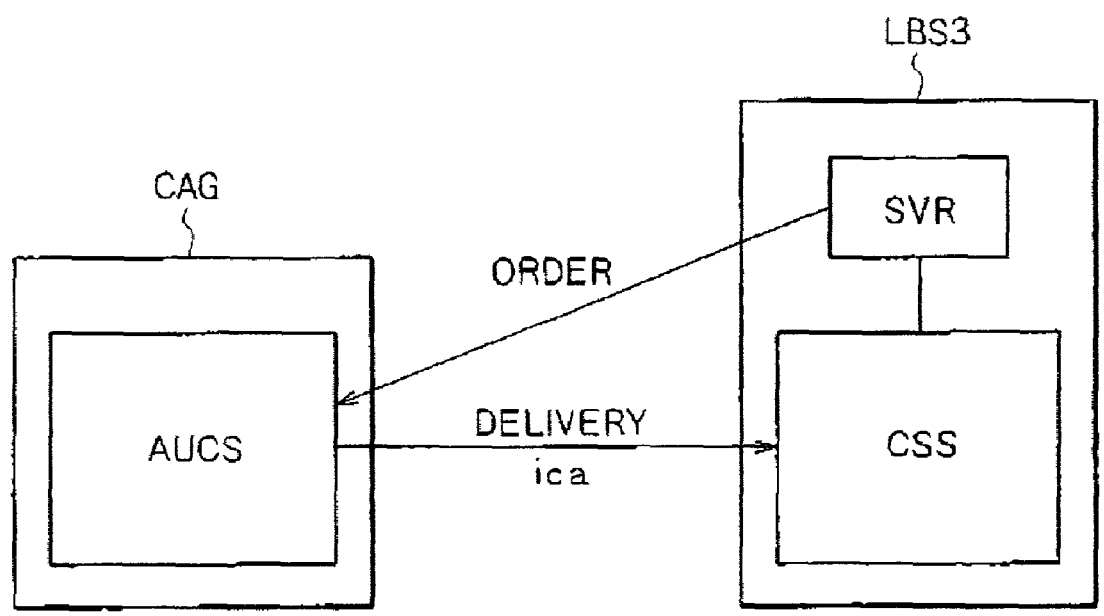
FIG. 17 illustrates a third business model to which the on-air content automatic sending method associated with the invention is applied.

FIG. 17 illustrates a third business model to which the on-air content automatic sending method associated with the present invention is applied. In the third business model, a licensed broadcaster LBS3, which is the holder of the broadcasting right of content, operates the content sending system CSS (broadcasting facilities) and the system management means SVR for managing it and orders an auction of CM frames to an on-air content organizer CAG which operates the CM frame auction system AUCS. Receiving the order, the on-air content organizer CAG executes an auction of CM frames via a communication network and delivers the created content organization information ica to the licensed broadcaster LBS3. On the basis of the supplied content organization information ica, the licensed broadcaster LBS3 organizes on-air content and broadcasts it.

Figure 18:
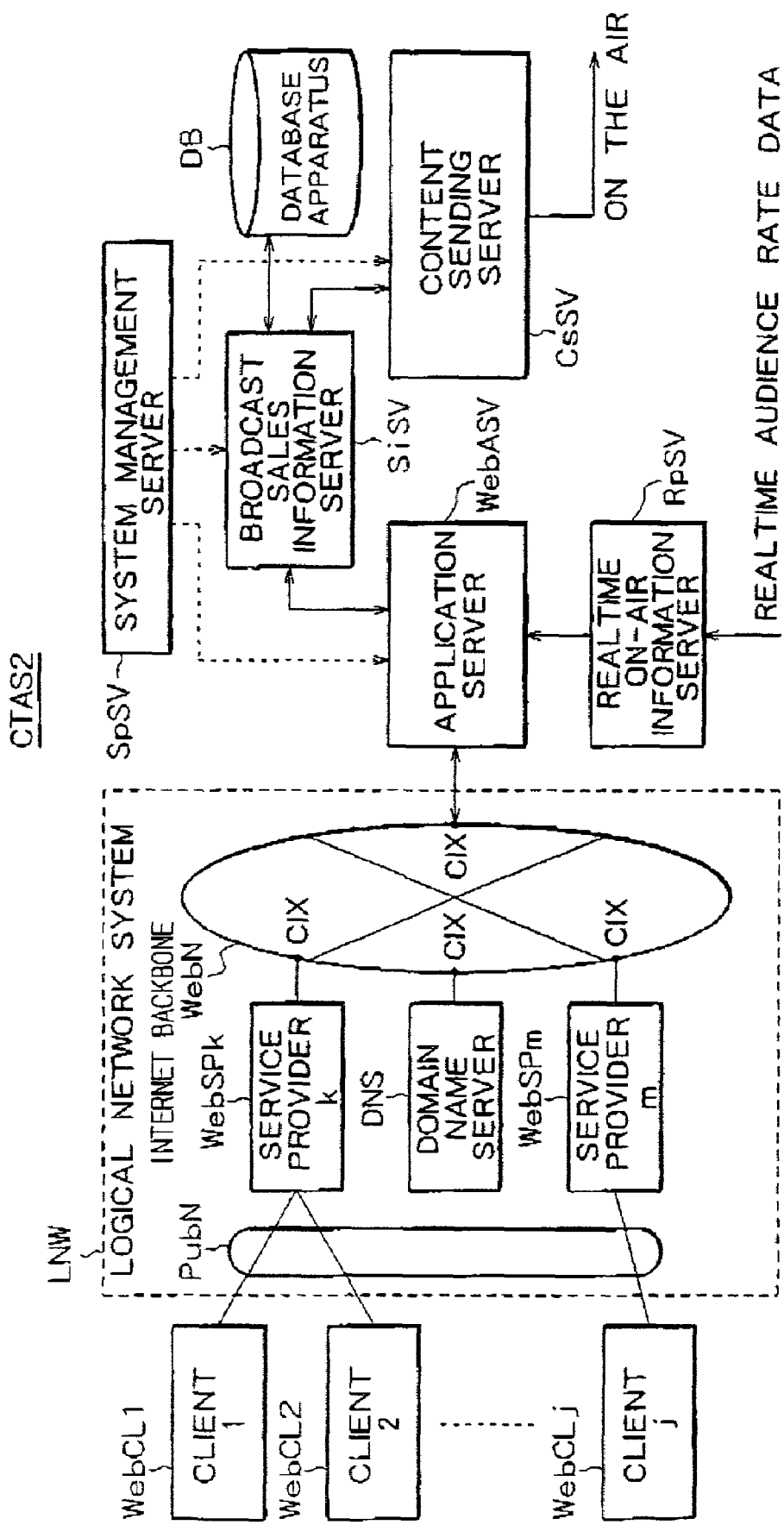
FIG. 18 is a schematic block diagram illustrating the on-air content automatic sending system based on the Internet practiced as one embodiment of the invention.

FIG. 18 is a schematic block diagram illustrating an on-air content automatic sending system practiced as one embodiment of the invention. This system includes other embodiments of the on-air content CM frame auction method and system according to the invention.

Figure 19:
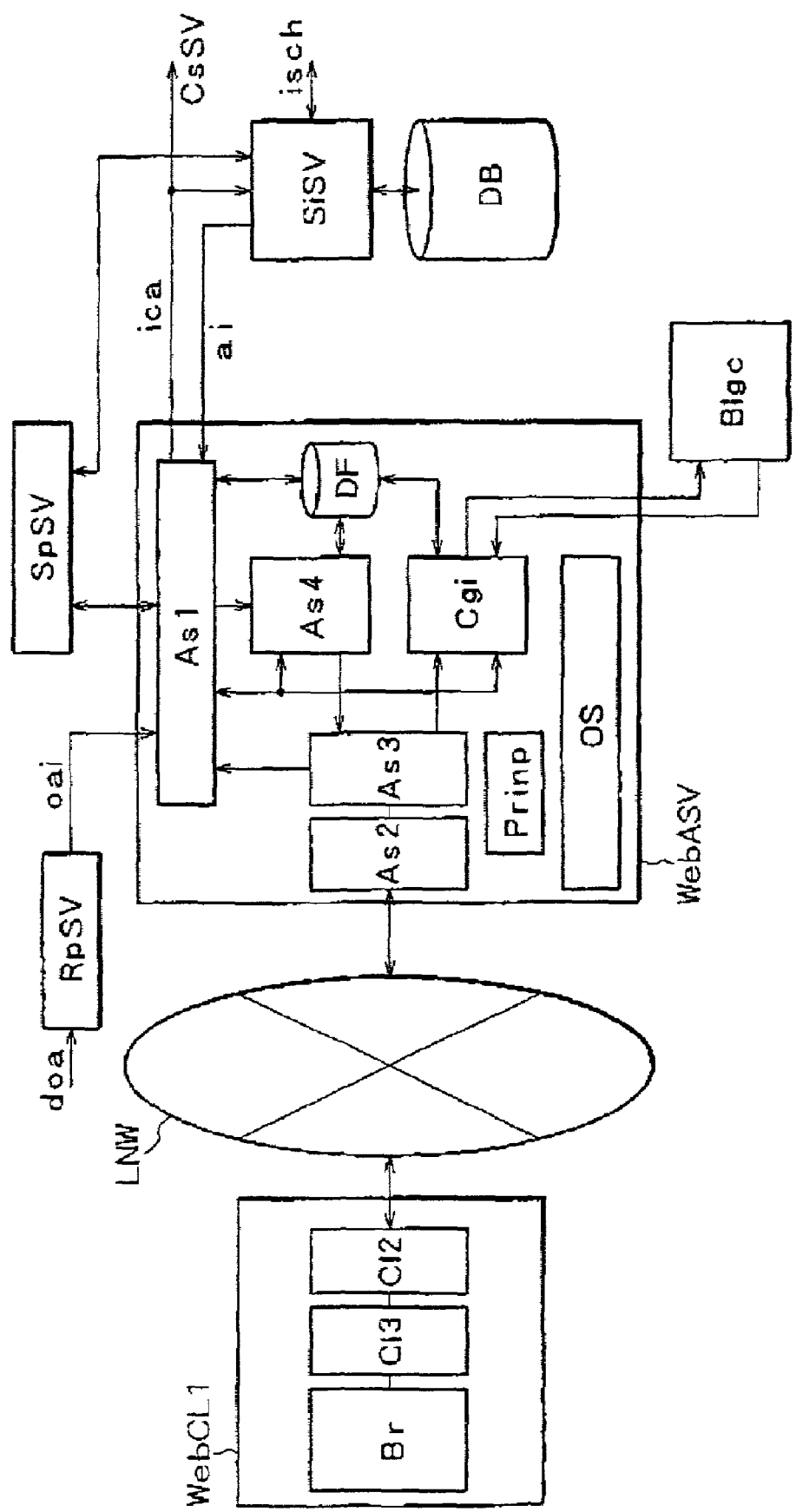
FIG. 19 is a schematic block diagram illustrating details of a main portion shown in FIG. 18.

FIG. 19 illustrates the details of a main portion shown in FIG. 18.

Packet network communication can be effectively applied to the on-air content CM frame auction method and system according to the invention. For a typical example of packet network communication, an Internet environment is applied, in which an Internet-based business model as an auction of television CM frames is proposed hereby as the on-air content CM frame auction method and system.

In this business model, the host side, which is an auctioneer (for example, the sales system of a broadcasting company), and the customer side, which is an auction tenderer (for example, advertisement agencies or advertisement departments of sponsors) are connected by the Internet, through which a network auction is performed on television commercial broadcast frames. To be more specific, by use of a Web page mechanism, which is one of Internet applications, an on-air content CM frame auction system is built and operated on a Web site.

According to these configuration and method, the information transfer between the auctioneer and auction tenderers including the transmission of tender information from the auctioneer to the tenderers and the transmission of auction application information from the tenderers to the auctioneer can be performed quickly and inexpensively with a simple operation.

If the above-mentioned configuration and method are adapted not only to transfer tender information and auction application information via the Internet, but also to execute a network auction during broadcasting to provide, in real time, the realtime on-air information of this broadcasting represented by realtime audience rate, a network auction configuration corresponding in a realtime manner to the actual broadcasting and the operation thereof can be embodied in a network environment.

This corresponds to the realtime auction described with reference to the previous embodiment and therefore the description thereof is used for the present embodiment for the purpose of brevity of description.

The on-air content automatic sending system CTAS2 associated with the present embodiment incorporates the above-mentioned business model to automate, on the network, a sequence of processes including the organization of CM frame network auction and on-air content, the transmission of on-air content, and the settlement of successful tender.

It should be noted that, in what follows, the description of the known configurations, functions, and technologies associated with the Internet will be omitted for brevity.

Referring to FIG. 18, the on-air content automatic sending system CTAS2 comprises a system management server SpSV for managing a whole system operation, a CM frame auction system AUCS2, a broadcast sales information server SiSV, a database apparatus DB, and a content sending server CsSV. The CM frame auction system AUCS2 comprises a Web application server WebASV, a realtime on-air information server RpSV, and an Internet backbone WebN.

In configuration, the system management server SpSV, the broadcast sales information server SiSV, the content sending server CsSV, and the realtime on-air information server RpSV are substantially the same as the system management means SVR, the broadcast sales information system SIS, the content sending system CSS, and the realtime on-air information processing system ROP shown in FIG. 12. It should be noted that the description of the same portions as those of the previous embodiment will be omitted for brevity.

The Web application server (hereafter referred to simply as an application sever) WebASV is connected to the Internet backbone WebN at an access position CIX. The Internet backbone WebN is connected to two or more Internet service providers (hereafter referred to simply as service providers) WebSPk through WebSPm and domain name servers DNSs at their nearest access positions CIXs. The access points supplied by the service providers WebSPk through WebSPkm to the Web clients can be connected to two or more Web clients (hereafter referred to simply as clients) WebCL1 through WebCLj via a public telephone line PubN.

The host of the CM frame auction system is developed on the application server WebASV as a Web site and configured so as to allow the clients WebCL1 through WebCLj to participate in auctions as tenderers via an interactive Web page.

The communication route along which clients WebCL1 through WebCLj access any of service providers WebSPk through WebSPm via the public telephone line PubN associating dialup and the communication route on the Internet backbone WebN up to the application server WebASV which manages a URL-identified CM frame auction Web site are not fixed as well known but change for each session. The plural service providers WebSPk through WebSPm which provide access points to plural clients WebCL1 through WebCLj each having a browser enter the Internet backbone WebN from plural access positions CIXs, obtain the IP address of a specified URL from a domain name server DNS, and transfer the IP address and data to the next service provider WebSPx in accordance with a routing table. The data are transmitted to the application server WebASV along a non-fixed route via the service provider WebSPx to which the final target application server WebASV is connected. Now, data transfer between a Web server and a Web client is performed in the same session. It should be noted that the application server WebASV may be connected directly to the Internet backbone WebN at an access position CIX without passing the service provider WebSP.

The communication routes provided here change for each session and plural service providers WebSPs along these routes change in their physical combination from time to time. However, the content of jobs processed between a Web client and a CM frame auction Web site are not affected by these changes. In addition, the communication routes do not affect the functionality of the CM frame auction system associated with the present invention.

Therefore, for the purpose of description, the public telephone line PubN, the Internet backbone WebN, and the plural involved service providers WebSPs may be collectively handled as logical transmission means, which is referred to as a logical network system LNW.

The application servers WebASVs which are applied to a CM frame auction Web site include Apache for example, which is traditional HTTP server software. One of the functions of Apache is SSI (Server Side Include), which replaces a portion of HTML document with a Web server processing result. Preparing a file having an extension "shtml" allows the use of SSI.

Apache can also be equipped with a CGI capability for packaging external components. However, the CGI capability one embodiment of the applicable component packaging technologies.

Another traditional example of Web server software is IIS (Internet Information Server) which operates on Windows NT®. IIS has interface ISAPI (Internet Server Application Programming Interface) and has a capability of packing external components by use of ASP (Active Server Pages).

Web servers and systems of which effective application is expected in the future will be described later.

The following describes a configuration of the CM frame auction system AUCS2 with reference to FIG. 19.

The application server WebASV comprises network auction management means As1 for managing and controlling the operation of auction processing, site side information transfer means As2 which functions as an interface with the logic network system LNW and executes information transfer with the client side (WebCL1 through WebCLj), encryption/decryption means As3 for encrypting and decrypting transmitted data, presentation information creating means As4 for creating data carrying image and audio (GUI data) to be presented on the client side and transmission data, a CGI handler Cgi for transferring information with the browsers of clients WebCL1 through WebCLj, a data file apparatus DF which functions as a working memory in addition to a data recorder, a Perl interpreter Prinp, and an operating system OS for controlling the system operation of the entire server. It should be noted that the site-side information transfer means As2 is equipped as an interface compliant at least with TCP/IP and HTTP.

The CGI handler Cgi is involved with data transfer including the acceptance of responses from clients WebCLn who applied for an auction on the basis of the supplied tender information and information transfer (component packaging) with a gateway program and accepts requests from the Web browsers of these clients to control the operation of external components. In the present embodiment, the CGI handler Cgi is written in Perl script and executed by the Perl interpreter Prinp which is executed and controlled by the operating system OS.

It should be noted that, generally, the handler is written in Perl in UNIX™ servers and in Visual Basic in Windows NT®.

The CM auction business logic Blgc which functions as an auction execution application program is an external component and functions as a gateway program which is triggered by the packaging CGI handler Cgi to execute back-end processing. In the present embodiment, the CM auction business logic Blgc is classified as an CGI application.

The auction processing capability of the CM auction business logic Blgc is substantially the same as the CM auction business logic Hs5 described with reference to the previous embodiment. The CM auction business logic Blgc triggered by a system command with arguments from the CGI handler Cgi written in Perl script executes auction application processing, successful tender processing, and acknowledgement/withdrawal processing (refer to FIG. 5). When the results of these processing operations are returned to the CGI handler Cgi, these results are recorded to the data file apparatus DF.

For the encryption/decryption means As3, SSL (Secure Socket Layer), which is a protocol to realize socket-level encryption and authentication capabilities disclosed as a technology for protecting the security of data transferred between a Web browser and a Web server, is used for example.

The operations of the broadcast sales information server SiSV, the content sending server CsSV, and the realtime on-air information server RpSV, and the network auction management means As1, the site side information transfer means As2, the encryption/decryption means As3, and the presentation information creating means As4 of the application server WebASV are substantially the same as those of the previous embodiment and therefore their descriptions will be omitted.

On the other hand, the configuration of each of the clients WebCL1 through WebCLj has a client side information transfer means CI2, encryption/decryption means CI3, and a browser Br in the case of client WebCL1 for example. In addition, each client has input/output equipment and an OS, not shown. The client side information transfer means CI2 is an interface compliant at least with TCP/IP and HTTP.

The following describes the management and operation of the on-air content automatic sending system CTAS2.

Receiving a new item inputted by a sales person from a sales terminal, the broadcast sales information server SiSV records sales terms such as the title, genre, content, broadcast date and time and period of the on-air content, the target layer of audience, the number and configuration of CM frames for sale, lowest desired sale prices, target sales, and whether to execute a realtime auction to the database apparatus DB along with auction information ai determined on the basis of these data and then sends a progression management request to the system management server SpSV along with all these pieces of information.

On the basis of the received information, the system management server SpSV starts time management and manages the operation of the application server WebASV which operates the CM frame auction Web site so as to end an auction a predetermined period before an actual on-air date and time in the case of a non-realtime auction to determine a sponsor, thereby making the CM frame auction system AUCS2 execute the auction. When the on-air time has been reached, the system management server SpSV manages the operation of the content sending server CsSV to automatically send the on-air content.

The following describes the management and operation, at the time of a non-realtime auction, of the network auction management means As1 of the CM frame auction system AUCS2. In the following description, it is assumed that the broadcast station side be the auctioneer.

The network auction management means As1 functions as the operator of a CM frame auction Web site and, when a command for operating a non-realtime auction comes from the system management server SpSV, requests the broadcast sales information server SiSV for auction information ai. The network auction management means As1 sends the obtained auction information ai to the presentation information creating means As4 to convert tender information including on-air content overview and a lowest desired sale price of a CM frame available for sale into a Web page format (for example, a HTML file). The encryption/decryption means As3 encrypts the resultant Web page. The encrypted Web page is presented to clients WebCL1 through WebCLj via the site side information transfer means As2 and the logical network system LNW. Consequently, the network auction management means As1 notifies the terminals of advertisement agencies and program client corporations of the start of a new CM frame auction.

On the basis of the tender information in the Web page GUI-developed by the browser Br, each of the tending advertisement agencies and program client corporations checks the content of a CM frame on sale and enters auction application information including the auction application price to be presented for a desired CM frame and the information of CM content to be broadcast into the corresponding input field of the Web page by considering the content of the program in which the desired CM frame is inserted, broadcast date, time, past audience rate, and information about competitive sponsors in adjacent frames of the program. The inputted information is encrypted to be sent to the CM frame auction Web site via the logical network system LNW as a response to the CM frame auction Web site.

If the above-mentioned input field processing is of a form format, a script associated with the triggering of the CGI handler Cgi is included in the response data. When the script being analyzed in the response is detected, the network auction management means As1 passes control to the operating system OS, which controls the operation of the CGI handler Cgi. In the present embodiment, because the CGI handler Cgi is of Perl script configuration, the Perl interpreter Prinp operates under the control of the operation system OS to sequentially process the script, control being passed to the CM auction business logic Blgc by a system command with arguments. A result of the execution of the auction application processing by the triggered CM auction business logic Blgc is returned to the CGI handler Cgi to be stored into the data file apparatus DF.

The network auction management means As1 triggers the presentation information creating means As4 to update the Web page to the content including the highest auction application price at that point of time, sponsor name, and product in the inputted auction application information. The updated Web page is immediately sent to clients WebCL1 through WebCLj to be displayed by the browser Br.

Each tending advertisement agency and program client corporation checks the highest auction application price by referencing the updated Web page. If a tenderer wants to tender with a higher price, the tenderer enters a new higher auction application price and sends the input to the CM frame auction Web site via the logical network system LNW as a response. On the basis of the received response, the processing is executed in the same manner as described above. The above-mentioned operation is repeated until a specified tender deadline. When the specified tender deadline has been reached, the acceptance of new auction application inputs are closed.

Next, the network auction management means As1 specifies the successful tender processing and drives the CM auction business logic Blgc via the CGI handler Cgi. From among the auction applications made during a predetermined period of time, the CM auction business logic Blgc sets successful tender candidates of that CM frame on the basis of the highest auction application price. An acknowledgement screen carrying a negotiation priority number and successful tender conditions is displayed for the successful tender candidates, starting with the candidate who presented the highest price.

If the tenderer having the highest negotiation priority number does not follow the acknowledgement procedure within a predetermined period of time, the negotiation right is shifted to the tenderer having the second negotiation priority number to request this tenderer for accomplishing the acknowledgement procedure.

If the acknowledgement procedure is not accomplished with a predetermined period of time or a withdrawal occurs, the screen is updated to push up the successful tender candidate having the second priority number to top. The resultant candidate starts the execution of the acknowledgement procedure.

In the case of a delay in accomplishment of the acknowledgement procedure or a withdrawal, a predetermined cancel fee is charged.

Successful tender information (the CM frame and the information about CM content to be incorporated) acknowledged by the success tenderer is automatically sent to the broadcast sales information server SiSV of the broadcast station as content organization information ica.

The broadcast sales information server SiSV records the supplied content organization information ica to the database apparatus DB for registration. Further, on the basis of the content organization information ica, the broadcast sales information server SiSV organizes program/CM organization information isch containing the content of program frame and the content of CM frame (such as broadcast time and CM material number) before the actual on-air time.

The organized program/CM organization information isch is sent from the broadcast sales information server SiSV to the content sending server CsSV at a predetermined time. In accordance with the content of the program frame specified by the program/CM organization information isch and the CM material number, the content sending server CsSV extracts the above-mentioned CM content from the CM bank and sequentially broadcasts the extracted CM content in a time-series manner. It should be noted that the CM content prepared by each successful tenderer is assumed to have been registered in the CM bank server before putting on the air.

A CM transmission record which has been broadcast is sent from the content sending server CsSV to the broadcast sales information server SiSV, which stores the received record into the database apparatus DB and creates broadcast record/settlement information iast to send it to the application server WebASV. The network auction management means As1 of the application server WebASV sends the information to only to the client WebCLn which is the provider (sponsor) via the presentation information creating means As4, the encryption/decryption means As3, the site side information transfer means As2, and the logical network system LNW.

Receiving the broadcast record/settlement information iast, the client WebCLn performs settlement processing by following a predetermined procedure after a certain period of time.

Described above is the case of a non-realtime auction. In the case of a realtime auction, the following management and operation are performed.

In the case of a realtime auction, the system management server SpSV operates the content sending server CsSV at on-air date and time to start the automatic transmission of on-air content and, at the same time, drives the application server WebASB operating the CM frame auction Web site to operate the CM frame auction system AUCS2, which executes a realtime auction of that CM frame immediately before its being put on the air, while reflecting the audience rate information onto the auction during the broadcasting of the on-air content. If a successful tenderer is determined several minutes for example before each CM frame is put on the air, the information about the CM content specified by that sponsor is immediately sent to the content sending server CsSV so as not to delay the broadcasting. Thus, every time a CM frame is successfully tendered, the information about CM content is supplied to the content sending server CsSV without delay, thereby controlling the automatic transmission such that the CM content can be put on the air without discontinuation or drop.

When a realtime auction operation command comes from the system management server SpSV, the network auction management means As1 requests the broadcast sales information server SiSV for auction information ai and sends the obtained auction information ai and the realtime on-air information (audience rate) oai inputted from the realtime on-air information server RpSV to the presentation information creating means As4 to convert tender information including on-air content overview, a lowest desired sale price of a CM frame available for sale, and current realtime audience rate into a Web page format. The resultant Web page is presented to clients WebCL1 through WebCLj via the site side information transfer means As2 and the logical network system LNW. Consequently, the network auction management means As1 notifies each advertisement agency and program client corporation of the starting of a new CM frame realtime auction.

On the basis of the tender information included in the Web page presented by the browser Br, each of the tending advertisement agencies and program client corporations checks the content of a CM frame on sale and enters auction application information including the auction application price to be presented to be broadcast for a desired CM frame and the information of CM content into the corresponding input field of the Web page by considering the content of the program in which the desired CM frame is inserted current realtime audience rate, and information about competitive sponsors in adjacent frames of the program. The inputted information is immediately sent to the CM frame auction Web site via the logical network system LNW as a response to the CM frame auction Web site.

Receiving the response, the network auction management means As1 causes the CM auction business logic Blgc to execute auction application processing via the CGI handler Cgi. It should be noted that the bidirectional information transfer between the CM frame auction Web site and the auction applicant via the Web page and the link with an external component are implemented by the CGI mechanism as described before. It will be apparent that this implementation may be realized by other bidirectional information transfer and link technologies than the CGI mechanism.

Next, The network auction management means As1 triggers the presentation information creating means As4 to update the Web page content including the highest auction application price at that point of time, sponsor name, and product in the inputted auction application information and update the current realtime audience rate. The updated Web page is immediately sent to clients WebCL1 through WebCLj to be displayed by the browser Br.

The auction application side checks the highest auction application price by the updated Web page and the most recent audience rate and, if the auction applicant desires to tender at the highest price, enters the new auction application price into the corresponding input field of the Web page, sending the Web page to the CM frame auction Web site via the logical network system LNW as a response. On the basis of the received response, the processing is executed in the same manner as described before. The above-mentioned operation is repeated until a specified tender deadline. When the specified tender deadline has been reached, the acceptance of new auction application inputs are closed.

Then, the network auction management means As1 specifies the successful tender processing and drives the CM auction business logic Blgc via the CGI handler Cgi, which determines the successful tenderer, namely the sponsor, of that CM frame on the basis of the highest auction application price. In the case of a realtime auction, unlike a non-realtime auction, for the content being broadcast, a CM frame which is put on the air several minutes for example after the current time is set by the auction in a feed forward manner, so that there is no temporal margin and therefore the withdrawal from successful tender (cancellation) is not permitted. The successful tender acknowledgement procedure may also be omitted.

The successful tender information (the CM frame and the material number of the CM content to be incorporated) is immediately registered in the broadcast sales information server SiSV as content organization information ica.

The CM content material number is sent from the broadcast sales information server SiSV to the content sending server CsSV immediately before the broadcasting of that CM frame. In accordance with this CM material number, the sending system extracts the corresponding CM content from the CM bank server and sends the extracted CM content at a predetermined time for broadcasting, and broadcasts the same. Thus, the auction and the CM content sending and broadcasting proceed in real time.

The storage of the sending record information by the broadcast sales information server SiSV into the database apparatus DB after broadcasting and the settlement processing by the sponsor are the same as with the above-mentioned non-realtime auction.

The following proposes another business model for a television CM frame auction based on an Internet environment.

When constructing an on-air content CM frame auction system on a Web site by use of a Web page mechanism, which is one of application forms of the Internet, an important point is how early and simply the timing of the updating of auction content by putting new tender information into a Web page is sensed by the customer side. In other words, this is a technology for capturing the attention of the customer side at a desired time. In the related-art Internet technologies, a push technology (push configuration) is proposed for this purpose. However, problems remain unsolved for the implementation of effective management of causing the customer side to sense the timing as early and easily as possible.

In addition, a requirement must be satisfied for the auctioneer side, namely the Web page management side, to disclose an auction Web page to only the selected customers for inviting them to an auction.

In order to implement the above-mentioned proposals, the present invention discloses a system based on both electronic mail and Web site mechanisms as an embodiment.

To be more specific, this system is configured so that, when electronic mail is used to capture the attention of a desired particular customer at a desired time and this customer opens the electronic mail addressed thereto when notified the incoming of the electronic mail, a clickable URL is arranged in the document of the electronic mail; clicking this URL causes the browser to automatically set up a predetermined auction Web page. This configuration is intended to made easy transition from the electronic mail mode to the Web site mode via the clickable URL, which is a known technology. This allows each customer to understand an auction without delay by received electronic mail and easily and immediately access the auction Web page.

Also, a known clickable map technology may be effectively applied top this electronic mail configuration.

Further, when arbitrary specifications are required; for example, a particular program genre highly associated with the business field of the customer side is specified or an auction in which to participate is selected by extracting a particular keyword from the title or introduction of a program, an associated auction Web page may be automatically selected by the terminology in an electronic mail document and the selected auction Web page may be automatically set up. For the applicable scripts in this case, XML for example is preferably used in addition to conventional HTML.

The above-mentioned configuration requires for the customer-side browser to have keyword extracting means, Web site selecting means for selecting a corresponding Web site, and display means for selecting any one of plural clickable URLs for display. The means may be configured as browser's inherent functionality, plugins to the browser, or helper applications.

The above-mentioned configuration allows the auctioneer by the application of the electronic mail capability, to selectively transmit tender information only to desired tenderers, can make the information immediately aware of this transmission, and can perform the information transfer between the auctioneer and the tenderer including the transmission of auction application information from the tenderers simply, quickly, and inexpensively by use of the Internet Web page capability.

Figure 20:
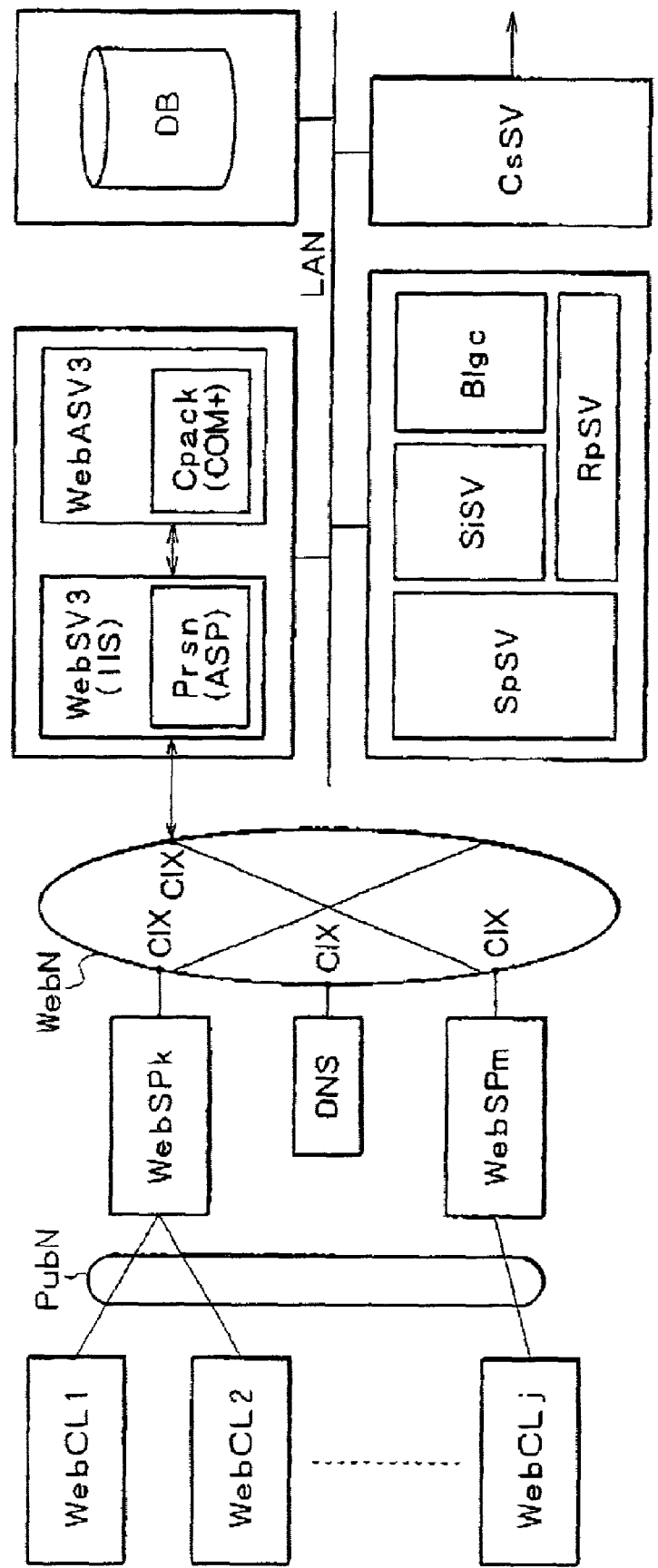
FIG. 20 is a schematic block diagram illustrating the on-air content automatic sending system based on the Internet practiced as another embodiment of the invention.

FIG. 20 is a block diagram illustrating an on-air content automatic sending system associated with the present invention practiced as another embodiment based on the Internet. With reference to FIG. 20, components similar to those previously described with the figures for describing the previous embodiments are denoted by the same reference numerals.

An on-air content automatic sending system CTAS3 associated with the present invention comprises a system management server SpSV for managing the operation of the entire system, a broadcast sales information server SiSV, a realtime on-air information server RpSV, CM auction business logic Blgc, a database apparatus DB, a content sending server CsSV, a Web server webSV3, an application server WebASV3, a LAN, and an Internet backbone WebN.

The Internet backbone WebN is connectible to plural service providers WebSPk through WebSPm and a domain name server DNS. Each of the service providers WebSPk through WebSPkm is connectible to plural clients WebCL1 through WebCLj via a public telephone line PubN.

The clients WebCL1 through WebCLj, the public telephone line PubN, the service providers WebSPk through WebSPm, the domain name server DNS, the Internet backbone WebN, and the Web server WebSV3 form the presentation layer.

The application server WebASV3 forms the application layer, the database apparatus DB forms the data source layer, and the system management server SpSV, the broadcast sales information server SiSV, the realtime on-air information server RpSV, the CM auction business logic Blgc, and the content sending server CsSV form the shelf layer. The Web server WebSV3 in the presentation layer, the application layer, the data source layer, and the shelf layer are interconnected by a LAN or a WAN in a mutual data transferable manner.

In the previous embodiments, the CGI mechanism is used as the bidirectional information transfer means between a customer and a Web site. Because the CGI mechanism starts a process every time a call is made and deletes the process upon the end thereof, the ASP/COM+ configuration for distributing the Web site processing to the Web server WebSV3 and the application server WebASV3 is preferably for use in mitigating the load to the resources of the server side. In a Windows® 2000 DNA server configuration for example, IIS for example is applied to the Web server WebSV3, in which the Web server WebSV3 converts the results of the processing by using ASP into an HTML document for information transfer with clients WebCL1 through WebCLj. ASP as used here functions as a server side script and is installed as a program Prsn which is executed by the Web server WebSV3.

On the other hand, the application server WebASV3 uses the COM+ configuration to link, via a server interface ISAPI for starting an external program, with the CM auction business logic Blgc, which is an external software component. This is one form of the distributed object technology, in which the CM auction business logic Blgc is positioned as a gateway program. In the COM+ configuration, component packaging is performed by applying the wrapping technology to the gateway program for example and a program Cpck for the component packaging is executably installed by the application server WebASV3.

The program Cpck is written in VB (Visual Basic) or VC++ for example. It should be noted that the program Cpck may be added with a business processing (CM auction) capability to take in part or all of the business processing which is originally executed by the CM auction business logic Blgc. If all of the business processing is taken in, the CM auction business logic Blgc may be omitted; however, when using existing software resources based on non-object-oriented language to incorporate them into the system, it is preferable to package a legacy external component by the COM+ configuration.

The above-mentioned configuration implements the bidirectional information transfer between the clients WebCL1 through WebCLj and the Web server WebSV3 by the execution of the program Prsn and implements the packaging of the CM auction business logic Blgc to the application server WebASV3 by the execution of the program Cpck.

It should be noted that the capabilities and operations other than above are substantially the same as those in the previous embodiments and therefore the description thereof is applied to these capabilities and operations.

In UNIX™ architectures, a distributed environment configuration on multiple platforms by the introduction of JSP/EJB (Java™ Server Page/Enterprise Java™ Beans) is proposed instead of the above-mentioned CGI mechanism. JSP/EJB also allows to take in a legacy system.

Figure 21:
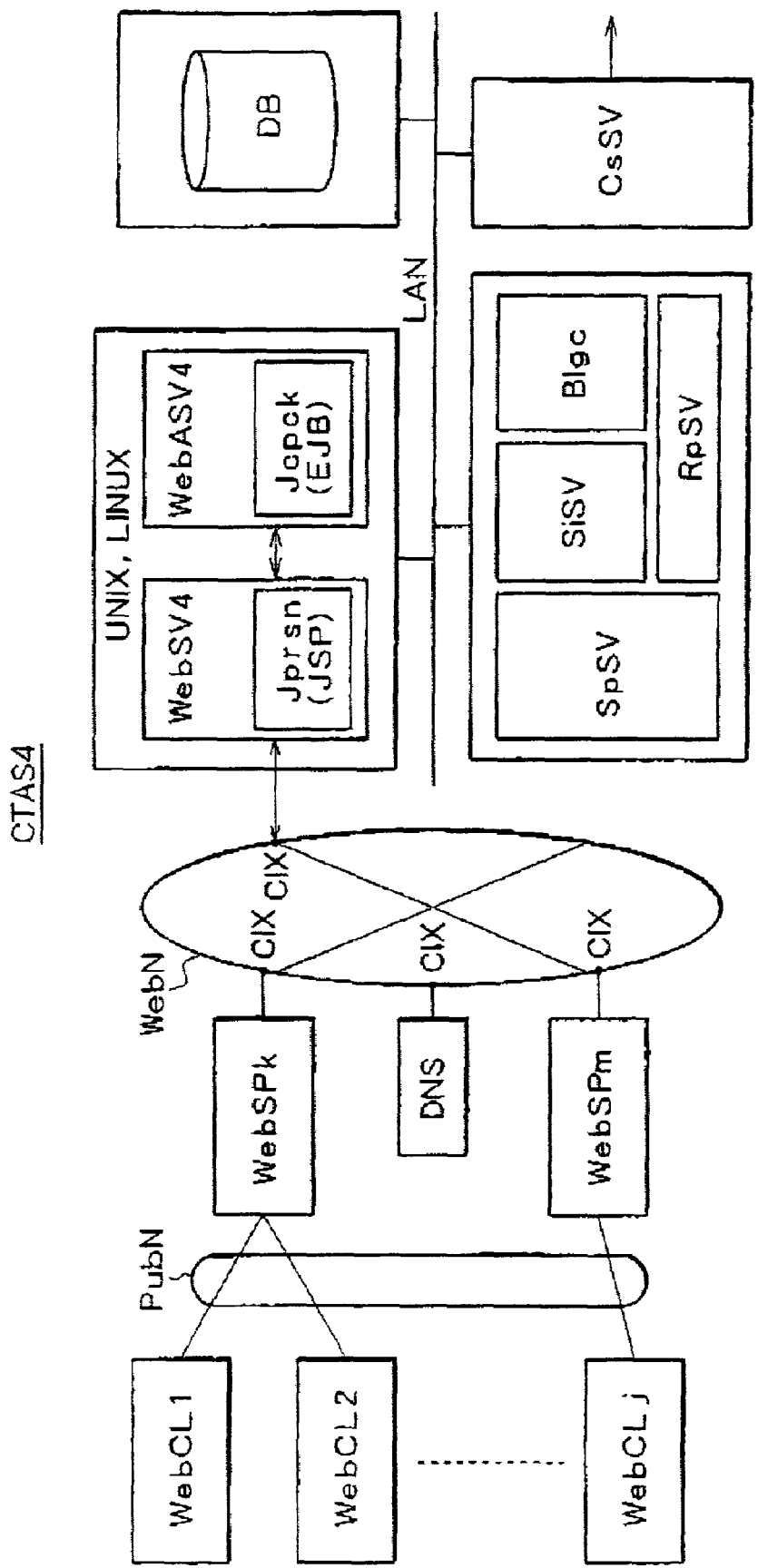
FIG. 21 is a schematic block diagram illustrating the on-air content automatic sending system based on the Internet practiced as still another embodiment of the invention.
Figure 22:
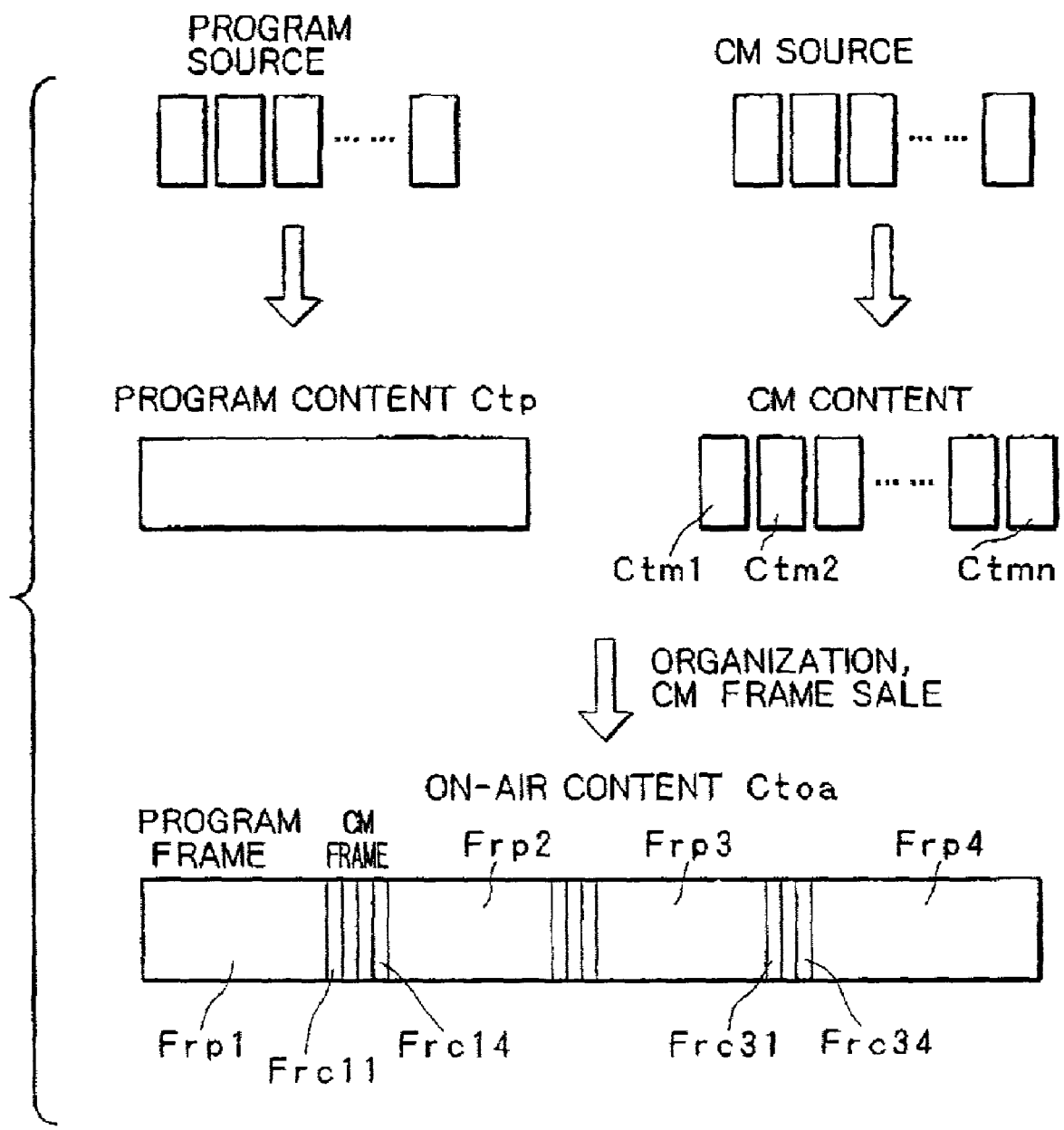
FIG. 22 illustrates a configuration of on-air content and processes to be executed for the establishment of on-air content in related-art technologies.

FIG. 21 is a block diagram illustrating an on-air content automatic sending system associated with the present invention practiced as a UNIX™ embodiment based on the Internet. With reference to FIG. 21, components similar to those previously described with the figures for describing the previous embodiments are denoted by the same reference numerals.

An on-air content automatic sending system CTAS4 associated with the present invention comprises a system management server SpSV for managing the operation of the entire system, a broadcast sales information server SiSV, a realtime on-air information server RpSV, CM auction business logic Blgc, a database apparatus DB, a content sending server CsSV, a web server WebSV4, an application server WebASV4, and an Internet backbone WebN.

The configurations of the Internet backbone WebN, service providers WebSPk through WebSPm, a domain name server DNS, and clients WebCL1 through WebCLj are the same as those of the previous embodiments.

The clients WebCL1 through WebCLj, a public telephone line PubN, the service providers WebSPk through WebSPm, the domain name server DNS, the Internet backbone WebN, and the Web server WebSV4 form the presentation layer.

The application server WebASV4 forms the application layer, the database apparatus DB forms the data source layer, and the system management server SpSV, the broadcast sales information server SiSV, the realtime on-air information server RpSV, the CM auction business logic Blgc, and the content sending server CsSV form the shelf layer. The web server WebSV4 in the presentation layer, the application layer, the data source layer, and the shelf layer are interconnected via a LAN or a WAN in a mutually data transferable manner.

In the present embodiment, in order to mitigate the load to the server-side resources in the bidirectional information transfer between a customer and a Web site, the processing of the auction Web site is distributed to the Web server WebSV4 and the application server WebASV4 and a JSP/EJB configuration is applied. The Web server WebSV4 performs bidirectional information transfer with the clients WebCL1 through WebCLj by use of JSP. Here, JSP functions as a server-side script and installed as a program Jprsn which is executed by the Web server WebSV4.

The application server WebASV4 packages the CM auction business logic Blgc, which is an external software component, by use of the EJB configuration. This is one form of the distributed object technology, in which the CM auction business logic Blgc is positioned as a component program. Program Jcpck for executing component packaging is executablly installed by the application server WebASV4.

It should be noted that the program Jcpck may be added with a business processing (CM auction) capability to take in part or all of the business processing which is originally executed by the CM auction business logic Blgc. If all of the business processing is taken in, the CM auction business logic Blgc may be omitted; however, when using existing software resources based on non object-oriented language to incorporate them into the system, it is preferable to package an external component by the EJB configuration.

The above-mentioned configuration implements the bidirectional information transfer between the clients WebCL1 through WebCLj and the Web server WebSV4 by the execution of the program Jprsn and implements the packaging of the CM auction business logic Blgc to the application server WebSV4 by the execution of the program Jcpck.

It should be noted that the capabilities and operations other than above are substantially the same as those in the previous embodiments and therefore the description thereof is applied to these capabilities and operations.

As described, the present invention provides the following advantages:

(1) The number of sales processes can be significantly reduced by the network-based sale by auction of CM frames, which is not dependent on CM frame sales person's effort.

(2) By receiving the data protected by a security system from the auctioneer via a network, each tenderer can obtain highly reliable tender information with fake information excluded.

(3) Referencing all items of tender information on the GUI, each tenderer can reasonably determine auction application prices.

(4) Each tenderer can send auction application information to the auctioneer via a network as data protected by a security system, so that highly reliable data transmission with information leakage excluded can be realized.

(5) Because each sponsor can know whether there is any CMs of a same category and any competitive sponsors in a same program before and after an auction application, the job required for the adjustment of CM frame alignment conventionally executed by the auctioneer can be omitted and therefore the number of necessary processes can be reduced.

(6) The realtime auction allows an auction of Cm frames to be continued via a network until immediately before the broadcasting of the program or, even during broadcasting, until immediately before they are put on the air. Further, referencing an audience rate in real time, tenderers can reasonably determine their auction application prices. Consequently, the prices of CM frames can be set in accordance with the market mechanism, thereby increasing the CM revenues of programs of relatively high audience rates.

(7) The successfully tendered CM frames are automatically registered in the broadcast sales system of the broadcast station and broadcast by use of the CM content previously registered in the CM bank server, thereby significantly streamlining the CM-associated job ranging from the sale of CM frames to the broadcasting of purchased CM frames.

(8) The charge settlement processing for the sponsors to be executed after broadcasting can be automated via a network, thereby significantly streamlining the settlement job.

As described above, in the on-air content CM frame auction method, a tenderer is notified of an auction, an auction application indicative of an auction application price is sent from the tenderer to the auctioneer, the information associated with an auction application status is disclosed by the auctioneer to the tenderer, and a successful tenderer is determined by the auctioneer as the sponsor on the basis of the auction application price. According to this method, the successful tenderer of the auction can be determined quickly and easily via a communication network. For plural CM frames in the same on-air content, the auction tenderer checks for competitive sponsors and adjusts the alignment of the CM frames. Consequently, the number of processes on the auctioneer side can be cut, thereby mitigating the processing load. Further, if two or more auction tenderers want a same CM frames, an optimum sale price can be quickly and easily set by the auction based on a communication network.

Furthermore, the on-air content CM frame auction system includes a communication network; first means for managing processing; second means for transmitting or disclosing information associated with a tender and auction application status of the CM frame to the auction tenderer; third means for transmitting the auction application from the suction tenderer; and fourth means for determining by the auctioneer a successful tenderer as the sponsor on the basis of the auction application price. According to this configuration, the auction of CM frames is executed via a communication network, thereby quickly and easily determining a successful tenderer and a sponsor of a CM frame. For plural CM frames in the same on-air content, the disclosure of the information associated with an auction application status allows the auctioneer to check for competitive sponsors including sponsors of the same kind of industry and to adjust the alignment of the CM frames. Consequently, the number of processes on the auctioneer side can be cut, thereby mitigating the processing load. Further, if two or more auction tenderers want a same CM frames, an optimum sale price can be quickly and easily set by the auction based on a communication network.

Moreover, in the on-air content automatic sending method, a tenderer is notified of an auction of CM frames from an auctioneer, an auction application indicative of an auction application price is sent from the tenderer to the auctioneer, the information associated with an auction application status is disclosed by the auctioneer to the tenderer, and a successful tenderer is determined by the auctioneer as the sponsor on the basis of the auction application price. According to this method, the successful tenderer of the auction and the sponsor of an auctioned CM frame can be automatically determined quickly and easily. Further, if two or more auction tenderers want a same CM frames, an optimum sale price can be quickly and easily set by the auction based on a communication network.

The disclosure of the information associated with an auction application status allows the auction tenderer to check for competitive sponsors including sponsors of the same kind of industry and to adjust the alignment of the CM frames. Consequently, the number of processes on the auctioneer side can be cut, thereby mitigating the processing load.

Further, on the basis of a specification by the sponsor, commercial content is incorporated in the CM frame to organize on-air content for transmission. Consequently, in addition to the automation of the auction of CM frames, a sequence of processes up to the actual broadcasting can be automated, thereby enhancing the efficiency and the significant reduction in the operational cost due to the significantly enhanced business rationalization.

Additionally, the on-air content automatic sending system includes: auction execution means for determining a sponsor of the CM frame by an auction to be executed via a communication network; automatic sending means for automatically sending on-air content; and automatic management means for managing the means. The auction execution means notifies by an auctioneer an auction tenderer of an auction of the CM frame via the communication network; accepts the auction application indicative of an auction application price from the auction tenderer; discloses information associated with an auction application status to the auction tenderer; and determines an auction successful tenderer of the CM frame as the sponsor on the basis of the auction application price. On the other hand, the automatic sending means, on the basis of a specification by the sponsor, sets commercial content to be incorporated in the CM frame and incorporates this content into the CM frame to organize on-air content for transmission.

According to this configuration, the auction of CM frames is automatically executed via a communication network, thereby quickly and easily determining a successful tenderer and a sponsor of a CM frame. If two or more auction tenderers want a same CM frames, an optimum sale price can be quickly and easily set.

The disclosure of the information associated with an auction application status allows the auction tenderer to check for competitive sponsors including sponsors of the same kind of industry and to adjust the alignment of the CM frames. Consequently, the number of processes on the auctioneer side can be cut, thereby mitigating the processing load.

On the basis of a specification by the sponsor, commercial content to be incorporated in the CM frame is set and incorporated into the CM frame to organize on-air content for transmission. Consequently, in addition to the automation of the auction of CM frames, a sequence of processes up to the actual broadcasting can be automated, thereby enhancing the efficiency and the significant reduction in the operational cost due to the significantly enhanced business rationalization.

While the preferred embodiments of the present invention have been described using specific terms, such description is for illustrative purposes only, and it is to be understood that changes and variations may be made without departing from the spirit or scope of the appended claims.

What is claimed is:

1. A method for selecting, during a broadcast of a television program to an audience, a provider of content for a commercial time slot within the broadcast of the television program, comprising:

acquiring, by a computerized system, at a first time after the broadcast begins, first on-air information comprising at least a first audience rate of the audience actually receiving the broadcast after the broadcast begins;

sending by the computerized system to a plurality of content providers, via an electronic communication network, notification of availability of the commercial time slot including information that is associated with the television program and the commercial time slot, and the first on-air information;

in response to the information and the first on-air information, receiving, by the computerized system, via the electronic communication network, before the commercial time slot begins, from one or more of the content providers, a respective first auction application for the commercial time slot;

selecting, by the computerized system, content from one of the content providers for the commercial time slot based upon the one or more first auction applications; and broadcasting, via the electronic communication network, the selected content to the audience at the commercial time slot within the broadcast of the television program.

2. The method of claim 1, further comprising:

setting, by the computerized system, a lowest price, based at least in part on at least some of the first on-air information;

determining, by the computerized system, that the first auction application comprises a first price and that the first price is greater than or equal to the lowest price; and accepting, by the computerized system, the first auction application;

wherein accepting the first auction application occurs before the commercial time slot begins.

3. The method of claim 2, further comprising:

acquiring, by the computerized system, at a second time during the broadcast, second on-air information comprising at least a second audience rate of the audience actually receiving the broadcast; and resending, via the electronic communication network, notification of availability of the commercial time slot, wherein the second audience rate is appended to the first audience rate, wherein the second time is after the first time.

4. The method of claim 3, wherein the first audience rate and the second audience rate are transformed into a chart for display to the one or more content providers.

5. The method of claim 2, further comprising:

in response to the information and the first on-air information, receiving by the computerized system, via the electronic communication network, before the commercial time slot begins, from a second one of the content providers, a second auction application, comprising a second price, for the commercial time slot;

determining, by the computerized system, that the first price exceeds the second price; and selecting, by the computerized system, at a time after determining that the first price exceeds the second price but before the commercial time slot begins, the first one of the content providers to provide the content for the commercial time slot.

6. The method of claim 1, further comprising broadcasting commercial content, designated by the first one of the content providers, during the commercial time slot via the electronic communication network.

7. The method of claim 6, further comprising:

acquiring, by the computerized system, during the commercial time slot, second on-air information comprising at least a second audience rate of the audience actually receiving the broadcast; and sending via the electronic communication network at least some of the second on-air information to the first one of the content providers.

8. The method of claim 1, wherein the electronic communications network is the Internet.

9. A computerized system for selecting, during a broadcast of a television program to an audience, a provider of content for a commercial time slot within the broadcast of the television program, comprising:

a programmable central processing unit;

a network interface, coupled to the central processing unit and coupled to an electronic communication network; and a memory, coupled to the central processing unit, comprising instructions that, when executed by the central processing unit, cause the system to carry out a method, comprising:

acquiring, at a first time after the broadcast begins, first on-air information comprising at least a first audience rate of the audience actually receiving the broadcast after the broadcast begins;

sending by a computerized system to a plurality of content providers, via an electronic communication network, notification of availability of the commercial time slot including information that is associated with the television program and the commercial time slot, and the first on-air information;

in response to the information and the first on-air information, receiving, by the computerized system, via the electronic communication network, before the commercial time slot begins, from one or more of the content providers, a respective first auction application for the commercial time slot;

selecting content from one of the content providers for the commercial time slot based upon the one or more first auction applications; and a transmitter coupled to the network interface to send the selected content to the audience at the commercial time slot within the broadcast of the television program.

10. The computerized system of claim 9, wherein the method carried out by the system upon execution by the central processing unit of the instructions in the memory further comprises:

setting a lowest price, based at least in part on at least some of the first on-air information;

determining that the first auction application comprises a first price and that the first price is greater than or equal to the lowest price; and accepting the first auction application;

wherein accepting the first auction application occurs before the commercial time slot begins.

11. The computerized system of claim 10, wherein the method carried out by the system upon execution by the central processing unit of the instructions in the memory further comprises:

acquiring, at a second time during the broadcast, second on-air information comprising at least a second audience rate of the audience actually receiving the broadcast; and resending notification of availability of the commercial time slot, wherein the second audience rate is appended to the first audience rate, wherein the second time is after the first time.

12. The computerized system of claim 10, wherein the method carried out by the system upon execution by the central processing unit of the instructions in the memory further comprises:

in response to the information and the first on-air information, receiving via the electronic communication network, before the commercial time slot begins, from a second one of the content providers, a second auction application, comprising a second price, for the commercial time slot;

determining that the first price exceeds the second price; and selecting, at a time after determining that the first price exceeds the second price but before the commercial time slot begins, the first one of the content providers to provide the content for the commercial time slot.

13. The computerized system of claim 9, wherein the method to be carried out by the system upon execution by the central processing unit of the instructions in the memory further comprises causing the broadcast of commercial content, designated by the first one of the content providers, during the commercial time slot.

14. The computerized system of claim 13, wherein the method to be carried out by the system upon execution by the central processing unit of the instructions in the memory further comprises:

acquiring, during the commercial time slot, second on-air information comprising a statistic reflecting a measurement of an attribute of the audience actually receiving the broadcast; and sending at least some of the second on-air information to the first one of the content providers.

15. The computerized system of claim 9, wherein the electronic communication network is the Internet.

* * * * *

UNITED STATES PATENT AND TRADEMARK OFFICE
CERTIFICATE OF CORRECTION

| | |
|---|---|
| PATENT NO. | : 7,590,586 B2 |
| APPLICATION NO. | : 10/123267 |
| DATED | : September 15, 2009 |
| INVENTOR(S) | : Jiro Kitayama |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1626 days.

Signed and Sealed this

Twenty-first Day of September, 2010

David J. Kappos
*Director of the United States Patent and Trademark Office*